(12) United States Patent
Hackley

(10) Patent No.: US 11,412,888 B2
(45) Date of Patent: Aug. 16, 2022

(54) COOKING APPARATUS

(71) Applicant: BBQ GUY'S MANUFACTURING, LLC, Baton Rouge, LA (US)

(72) Inventor: Michael F. Hackley, Baton Rouge, LA (US)

(73) Assignee: BBQ GUY'S MANUFACTURING, LLC, Baton Rouge, LA (US)

( * ) Notice: Subject to any disclaimer, the term of this patent is extended or adjusted under 35 U.S.C. 154(b) by 160 days.

(21) Appl. No.: 16/683,961

(22) Filed: Nov. 14, 2019

(65) Prior Publication Data

US 2020/0113383 A1 Apr. 16, 2020

Related U.S. Application Data

(63) Continuation of application No. 15/763,270, filed as application No. PCT/US2016/063464 on Nov. 23, 2016, now Pat. No. 10,517,427.

(60) Provisional application No. 62/258,686, filed on Nov. 23, 2015.

(51) Int. Cl.
*A47J 37/07* (2006.01)

(52) U.S. Cl.
CPC ....... *A47J 37/0704* (2013.01); *A47J 37/0763* (2013.01); *A47J 37/0786* (2013.01)

(58) Field of Classification Search
CPC ........ F26B 21/06; F26B 21/04; F26B 23/002; F26B 23/022; F26B 2210/12; Y02P 70/405

See application file for complete search history.

(56) References Cited

U.S. PATENT DOCUMENTS

| | | | | |
|---|---|---|---|---|
| 3,276,440 | A * | 10/1966 | Sazegar | A47J 37/0704 126/25 A |
| 7,861,705 | B2 * | 1/2011 | Hulsey | A47J 37/07 126/25 A |
| 8,399,810 | B2 * | 3/2013 | Ahmed | A47J 37/0709 219/438 |
| 10,517,427 | B2 * | 12/2019 | Hackley | A47J 37/0704 |
| 2010/0095946 | A1 * | 4/2010 | Creel | F24B 1/192 126/25 R |
| 2011/0214662 | A1 * | 9/2011 | Contarino, Jr. | A47J 37/0786 126/25 R |
| 2014/0021314 | A1 * | 1/2014 | Bourlier | A47J 37/0786 248/225.11 |
| 2014/0026766 | A1 * | 1/2014 | Goff, IV | A47J 37/0786 99/445 |
| 2015/0075515 | A1 * | 3/2015 | Lin | A47J 37/0713 126/25 R |
| 2015/0144238 | A1 * | 5/2015 | Traeger | A47J 37/0786 150/165 |

* cited by examiner

*Primary Examiner* — David J Laux
(74) *Attorney, Agent, or Firm* — Kean Miller, LLP; Robert Devin Ricci; Lauren J. Rucinski

(57) ABSTRACT

A kamado style cooking apparatus comprising a cooking chamber having a high heat capacity and a vent system, wherein the cooking chamber comprises a thickened cast metal such as aluminum capable of being drilled or tapped to allow external components to be attached thereto. The cooking chamber is defined by a base unit and a top unit disposed over the base unit that is capable of moving from an open to a closed position via a hinge component. The top and base units further comprise a tongue and grove-like sealing means for creating an at least partial seal when closed.

20 Claims, 16 Drawing Sheets

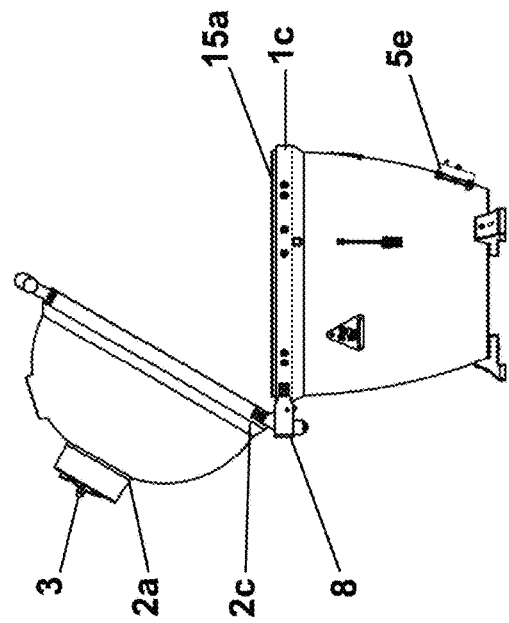
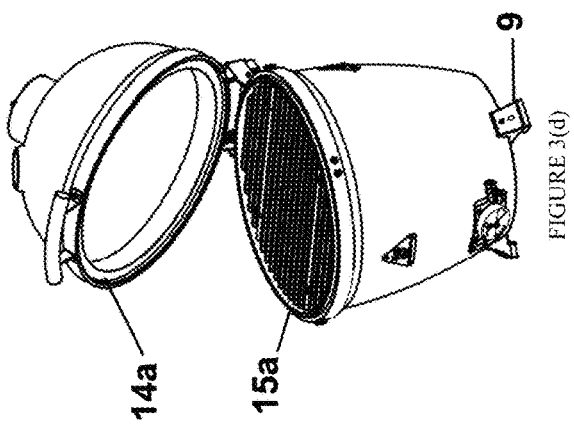
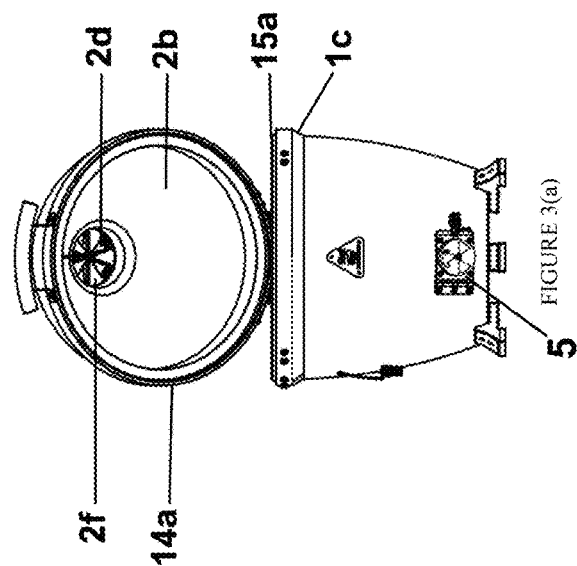
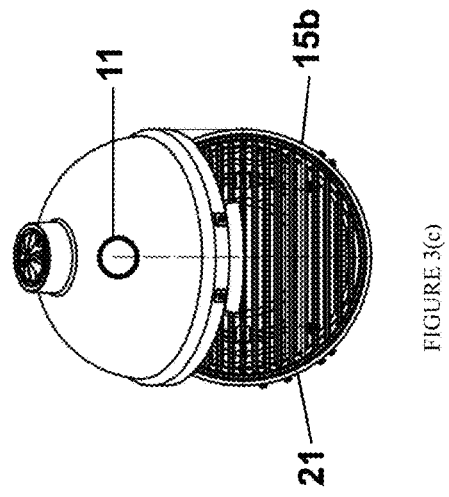

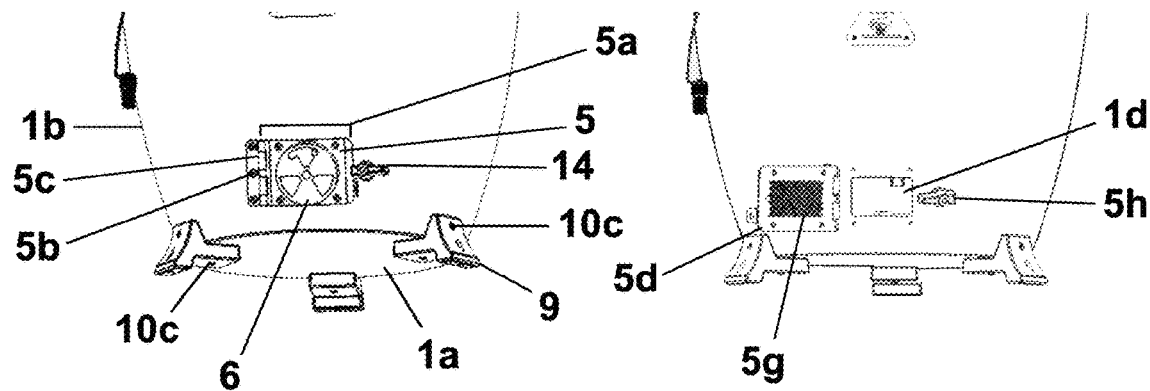
FIGURE 9(a)
FIGURE 9(b)
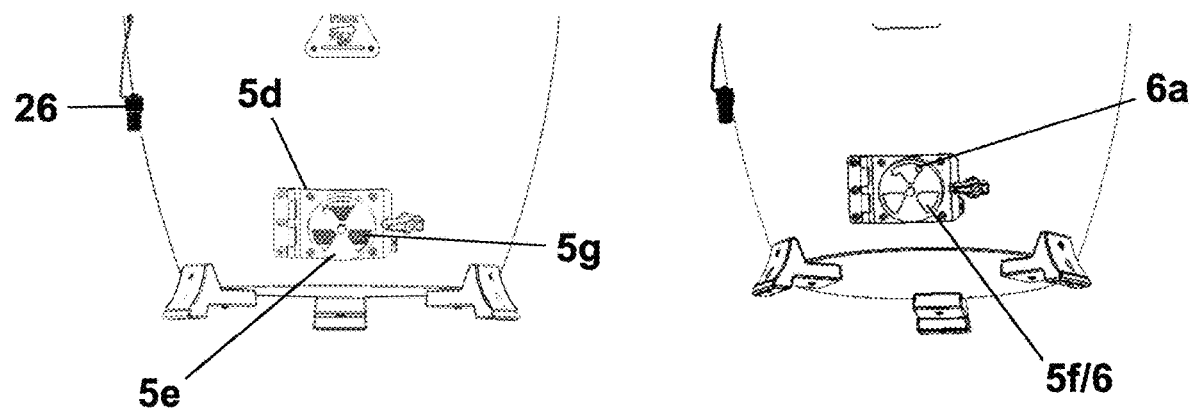
FIGURE 9(c)
FIGURE 9(d)

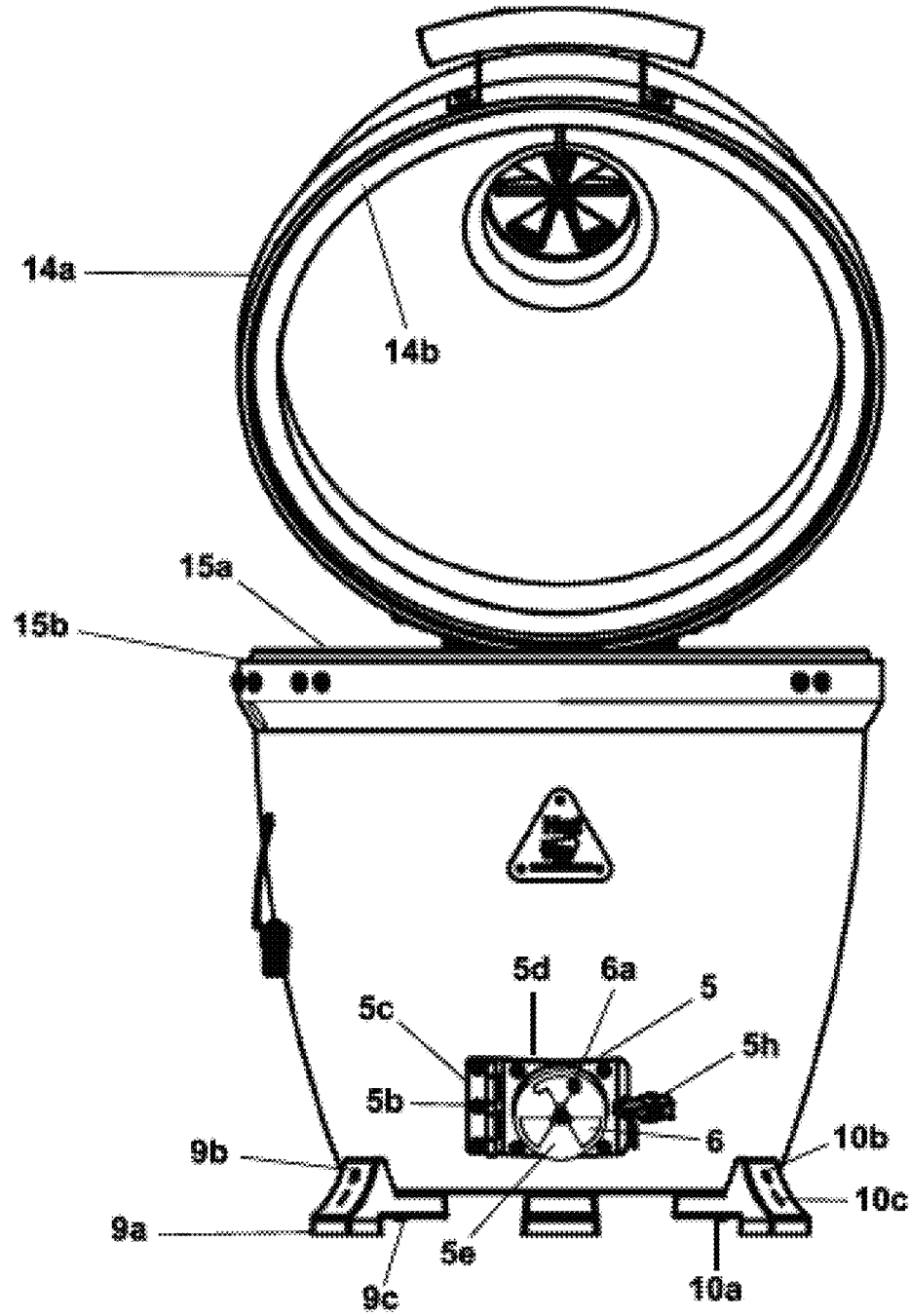

COOKING APPARATUS

CROSS REFERENCE TO RELATED APPLICATIONS

This application is a Continuation of National Stage U.S. patent application Ser. No. 15/763,270 filed Nov. 23, 2016 entitled "COOKING APPARATUS", which claims benefit and priority of International Application No. PCT/US2016/63464, filed Nov. 23, 2016, which claims benefit and priority of U.S. provisional application No. 62/258,686, entitled Cooking Apparatus filed on Nov. 23, 2015.

FIELD OF THE DISCLOSURE

The present disclosure relates, in some embodiments, to a cast aluminum grill. More specifically, the disclosure provides for a cast aluminum kamado-style grill that is readily and easily customizable, durable, and embodies numerous other improvements over the prior art.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

BACKGROUND OF THE DISCLOSURE

The commercial and personal grilling markets have blossomed over the past few years. Numerous high-end charcoal or wood burning grills have been designed and introduced to the market. Perhaps the most popular style of grills being introduced to the market is the 'kamado' style grill which is a modernization of a traditional Japanese wood or charcoal fueled cook stove. The industry regards these grills as notably different from other types of grills in terms of their functionality, versatility, style, and the science behind these cooking apparatus. As such, they are markedly distinct from other types of charcoal grills.

A traditional "kamado" is a Japanese wood or charcoal fueled cook stove. Modern kamado style cookers are made from a variety of materials including high fire ceramics, refractory materials, double wall insulated steel, traditional terra cotta, and a mix of Portland cement and crushed lava rock. Most commonly, the modern kamado style grill is typically formed out of a thick layer of ceramic materials. The use of ceramic in kamado stoves has been known and used for centuries primarily in Japan because ceramic is capable of efficiently absorbing and holding heat at both high and low temperatures for extended periods of time. These properties allow the kamado style grills to be versatile in that they can be used for both smoking meats, which is typically performed in the range of 225-275 degrees for numerous hours, baking and broiling, and for grilling at much higher temperatures of 450 degrees or higher. The heat chamber of a kamado grill is generally elongated such that a heat defector can be placed between the heat source and the dome lid, creating a convection oven effect in the cooking chamber.

The unparalleled versatility of kamado style grills is perhaps the most notable difference between kamado style grills and their traditional counterparts. Whereas traditional grills are limited to either high temperature grilling devices or low temperature smokers, the engineering of kamado style grills allows them to cook at the full spectrum from low and slow smokes to grilling at temperatures of 800 degrees or more. Most importantly, the engineering allows for these temperatures to be controllably reached and maintained for long periods of time. For this reason, kamado style grills are regarded as distinct from their traditional grilling and smoker counterparts known throughout the bar-b-que industry.

The efficiency of the modern kamado style grill design can perhaps best be exhibited in its ability to obtain and hold temperatures using low fuel amounts (i.e., smaller amounts of charcoal and wood than a typical grill or smoker). The efficiency lies in the insulation, often provided by ceramic materials in conventional kamado grills. The insulation of a ceramic kamado cooker retains and radiates heat back into the cooking chamber, meaning that less charcoal and oxygen are required. Those skilled in the art recognize that the airflow causes meat to dry out; thus, kamados are typically well suited for long smokes of big pieces of meat.

For example, when smoking a pork shoulder, it is generally accepted that the meat should be smoked 'low and slow' at a temperature of 225 degrees. Although the time will vary from cook to cook, a general estimate is that the meat has to be smoked for 1-1.5 hours per pound, meaning that a 10 pound pork shoulder will be smoked for roughly 10-15 hours before it reaches the desired internal temperature of 195 degrees, which is the generally accepted minimum temperature for the collagen and fibers in pork to have broken down for pulled pork.

In a typical smoker, fuel will have to be routinely introduced to maintain temperature at a steady 225 degrees. Every time any cooking chamber is opened to introduce more fuel, temperature is lost and becomes unbalanced, leading to uneven cooking. Such actions can affect the cooking process in many ways. For example, when the cooking chamber opens, the moisture released from the meat is able to escape from the confines of the grill dome and is lost to the ambient atmosphere. Worse still, ambient air is also able to enter into the system. Because airflow is one of the leading causes of dry meat, the entry of ambient air can directly impact the dryness of the item being cooked. Additionally, the uncontrolled influx of oxygen into the cooking chamber will stoke the fire, causing the flame system to become unbalanced. These problems are further compounded in nearly all non-offset smokers because the meat has to be removed entirely from the smoker in order to access the location where the fuel is to be introduced. Actual offset smokers likewise suffer their own deficiencies.

However, the kamado style grill is capable of maintaining temperature using low amounts of fuel exposed to a controlled, minimum flow of oxygen; therefore, it is often possible to conduct a full 10-15 hour (or longer) smoking process using only the fuel initially introduced into the grill. This type of temperature control is generally reserved for gas and propane grills which are not suited for smoking meats because of the lack of smoke flavor and difficulty in introducing the flavors. But, ceramic kamado style grills, such as the grills available from Big Green Egg® and Primo® Grills and Smokers, have shown such efficiency because they have low heat loss and fuel usage. (BIG GREEN EGG is a registered trademark of Edward R. Fisher, and PRIMO is a registered trademark of Primo Ceramics, L.L.C.). Because the smoking process is capable of being conducted without the need to introduce additional fuels during the smoke, the food cooked in these kamado style grills to retain its moisture and oils.

The true versatility is perhaps best exhibited in the kamado's ability to perform a 'reverse sear' method to cook larger pieces of red meat such as prime ribs. Basically, the notion of the reverse sear is to cook the meat low and slow indirectly at a lower temperature such as 250 degrees until it reaches a desired temperature, and then to raise the temperature significantly to around 400-600 degrees in order to give the meat a seared crust. By comparison, using traditional cooking methods, a prime rib is typically cooked in an oven at 400 degrees until the desired temperature. This method causes a large amount of the meat's juice to release from the meat and collect in the pan. In order to prevent the waste of these juices, an au jus is typically created using the drippings as a base and is served alongside the meat. On a kamado style grill, it is possible to cook the meat with a reverse sear method so that the juices are not released in the first place. To cook a prime rib under this method, the kamado style grill is set up to cook indirectly at a lower temperature such as 250 degrees. The meat is introduced onto the kamado style grill and is uniformly cooked or smoked until it reaches a desired temperature, typically about 115 degrees if medium rare is ultimately desired. Once the meat is at the desired internal temperature, it can be removed and the kamado style grill can be adjusted by opening the flue system to cook directly at a higher temperature. For example, it is common in such a method for the temperature of the kamado style grill to be heated to 400-600 degrees by increasing the flow of oxygen into and exhaust out of the cooking chamber. Once at the desired temperature, the meat is reintroduced and seared on all sides to form a crust that traps the juices while raising the internal temperature to the desired doneness. Using this method, the juices typically do not leak out of the meat in noticeable quantities because the meat is only exposed to high temperatures for short periods.

It is clear that kamado style grills demonstrate great benefits and versatility which put them in a separate class from other grills. But despite the obvious benefits over traditional grills and smokers, the kamado grills available in the market place suffer serious deficiencies. The vast majority of kamado grills comprise heat tolerant and absorptive ceramic materials, which generates some of the best qualities of these kamado style grills. However, the ceramic itself introduces numerous drawbacks, particularly in terms of its durability as ceramic materials are prone to chipping, cracking, crazing, and shattering. While ceramic may be a good insulator of heat, it is not very tolerant to quick changes in heat, and such exposure has been known to cause the ceramic to crack. The greatest danger to cracking is through contact with external forces which generally prevents the grills from being portable. Typically, the kamado style grills are permanently situated in a housing such as a grill table or cart to minimize exposure, but even such measures pose a risk as kamado style grills are sometimes dropped or damaged during or after the mounting stage into these tables or carts. Still, the grills are commonly damaged during shipping and transportation, even when painstakingly packaged. Such issues have prevented many third party retailers from selling these products on-line as they would have to ship the products to consumers, risking damage that would not be covered by the manufacturer.

Ceramic products also suffer from the drawback that they cannot be modified once casted. Because the typical kamado style grill is shaped from a single ceramic mold, it is nearly impossible or, at least, very risky to drill any holes into the ceramic shell for mounting of any components. This leads to additional drawbacks which are evidenced in numerous kamado style grills. For example, it is a given that the grill top or lid must be separable from the base in order to access the interior of the cooking chamber and the food being cooked. To accommodate this separation, tension spring hinges are often employed to connect the top (lid) and base structures such that the top can be manipulated on the hinge so as to separate from the base. However, the hinge cannot be directly attached to the top and base because the kamado style grill components cannot be drilled or threaded for screws. Additionally, even if a certain location of the ceramic would be capable of being drilled, the unitary ceramic structure would still lack the necessary tensile strength to account for the stress of pivoting the top lid. Thus, the industry has turned to external bands that are pressure fit around the entirety of the top and base structures which in turn is mechanically connected to the hinge. Effectively, the external pressure fit bands indirectly attach the hinge to the components and distribute the weight around the entire structures. In practice, this can cause several issues. First, it requires a great deal of adjusting to align the external pressure fit bands properly to create a good seal. Proper alignment is instrumental as the kamado style grill requires precise oxygen control to maintain balanced heat; therefore, even a slight gap or misalignment can throw off the efficiency of the grill. Second, the pressure nature of the external pressure fit bands causes tension to be exerted on the ceramic, which can in turn cause chipping, cracking, or even structural damage that would impede the use of the grill. It is nearly impossible to safely ship the units assembled without damaging the grill. Thus, it is routinely an untrained end user who installs these external pressure fit bands, not a trained professional such as the manufacturer, further compounding these issues. This creates ample opportunity for the end user to improperly install the external pressure fit bands, causing the components to be imbalanced impeding a proper cook, or otherwise break.

The use of external pressure fit bands often results in a less than perfect seal between the top of the grill and the base. In order to compensate for this gap, gaskets of felt-like Kevlar are typically applied to the open edge of the top and base. Therefore, when the top is down in the closed position, the gaskets will come into contact with each other and create a seal. However, because these gaskets are exposed to high temperatures, they often wear out over time and are susceptible to being scorched and will have to be replaced, increasing operating expense that will compound over time.

The external pressure fit bands also suffer from intrinsic design faults themselves. To support the weight of the top unit, the bands are typically constructed from hard metals such as iron and steel. While these metals may be well-suited to support the load of the top lid, they are prone to rusting when exposed to elements. Thus, as grill components, which are almost always exposed to the ambient atmosphere and often to precipitation, the bands will rust overtime and need to be replaced. This is particularly troublesome in marine environments where the bands may be exposed to saltwater. If not replaced, the bands may be prone to mechanical failure that can result in a damaged or broken grill.

As previously indicated, ceramic kamado style grills are not easily transported, particularly after initial delivery and setup. Therefore, they are usually mounted into carts and tables where they will be used. Many grill tables are made out of wood which obviously poses a risk of combustion when in contact with a high temperature kamado style grill for extended periods of time. Air and cement are typically used to dissipate the heat so as to help prevent a fire. In order to create a cushion of airflow below the kamado style grill, the grill is generally raised and propped up via "feet" components that are made of temperature resistant material, such as ceramic or concrete, which allow for a cushion of air to flow underneath the base and dissipate heat. Additionally, the kamado style grill can be propped on cement blocks which will dissipate the heat to a degree that it will not cause combustion. Even these safety features pose additional risks to the grills themselves and to the surrounding areas. There exists no way to securely attach the grill to the feet or cement blocks because the grill chassis cannot be tapped or drilled into. Therefore, while external components can be used to aid in fire prevention, they do so in a less than secure manner that introduces the risk that the kamado style grill would tip over, cracking the ceramic or starting a fire.

Attempts have been made in the past to provide a kamado style grill made out of materials other than just pure ceramic, but they too exhibit their own issues. These attempts demonstrate a hybrid-ceramic kamado style grill with dual layers of materials that often involves double wall insulated steel which houses an insulating component between the steel walls. For example, Caliber Range Corporation offers a ThermaShell Pro Grill kamado style grill which uses a double layer of 304 grade stainless steel enclosing a layer of ceramic insulation. Although an improvement in many ways, this design also exhibits a number of problems. The ceramic insulation may be housed within stainless steel casings, but the very existence of ceramic is a weakness to the design as it remains prone to cracking and breaking. Additionally, while the stainless steel can be drilled or tapped, the ability to do so is limited because it can only be done in gaps in the ceramic. This means that areas must exist in the construction of the kamado style grill does not have the ceramic insulating layer. This limits the efficiency of the grill to maintain and hold heat, and also reduces the ability to modify the location of the drillings as may be necessary for customizing the kamado style grill. Also, the stabilizing devices such as feet would most likely be attached to the bottom, an area that must be insulated as it is likely to contact fallen embers. In effect, the drill locations have to be specifically considered in the design, limiting the ability to customize the kamado style grill at any time after production. Also, the manufacture of this design requires multiple additional steps and components which are not typically required in the creation of a ceramic kamado style grill but are required to line up and create the layered unit, increasing the manufacturing costs.

Accordingly, there exists a strong need for a durable kamado style grill that is capable of harnessing the versatility and cooking abilities of the traditional and modern kamado style grills while solving the deficiencies noted in kamado style grills sold and used today.

DESCRIPTION OF THE DRAWINGS

The drawings constitute a part of this specification and include exemplary embodiments of the Cooking Apparatus, which may be embodied in various forms. It is to be understood that in some instances, various aspects of the invention may be shown exaggerated or enlarged to facilitate an understanding of the invention. Therefore the drawings may not be to scale.

FIG. 1(a) through FIG. 1(d) is a depiction of one embodiment of the Cooking Apparatus disclosed herein which shows a general external outlay of the components comprising a cooking apparatus in the closed position wherein FIG. 1(a) is a front view, 1(b) is a side view, 1(c) is a top view looking down at the closed chamber, and 1(d) is an angled view.

FIG. 3(a) through FIG. 3(f) is a depiction of the same embodiment as in FIGS. 1(a) through 1(d) wherein the top unit lid is opened. FIG. 3(a) is a front view; 3(b) is a side view; 3(c) is a top view looking down at the opened chamber; and 3(d) is an angled view. FIGS. 3(e) and (f) are the same side view as 3(b) with different components labeled.

FIG. 4(a) is a front view; 4(b) is a side view; 4(c) is a top view looking down at the opened chamber; and 4(d) is an angled view.

FIG. 5(a) is a front view; 5(b) is a side view; 5(c) is a top view looking down at the opened chamber; and 5(d) is an angled view.

FIG. 6(a) is a front view; 6(b) is a side view; 6(c) is a top view looking down at the opened chamber; and 6(d) is an angled view.

FIG. 7(a) is a front view; 7(b) is a side view; 7(c) is a top view looking down at the opened chamber; and 7(d) is an angled view.

FIGS. 9(a) through 9(d) show the air intake regulator unit in various configurations. FIG. 9(a) shows the unit in a completely closed configuration. FIG. 9(b) shows the configuration completely open wherein the door member is pivoted away from the aperture via the hinge mechanism. FIG. 9(c) depicts a configuration where the door member is closed but the vent apertures are fully open. FIG. 9(d) depicts a configuration where the locking mechanism is engaged.

FIG. 11 depicts a zoomed in front view to illustrate components of one embodiment of the cooking apparatus.

DISCUSSION

Figure 1:
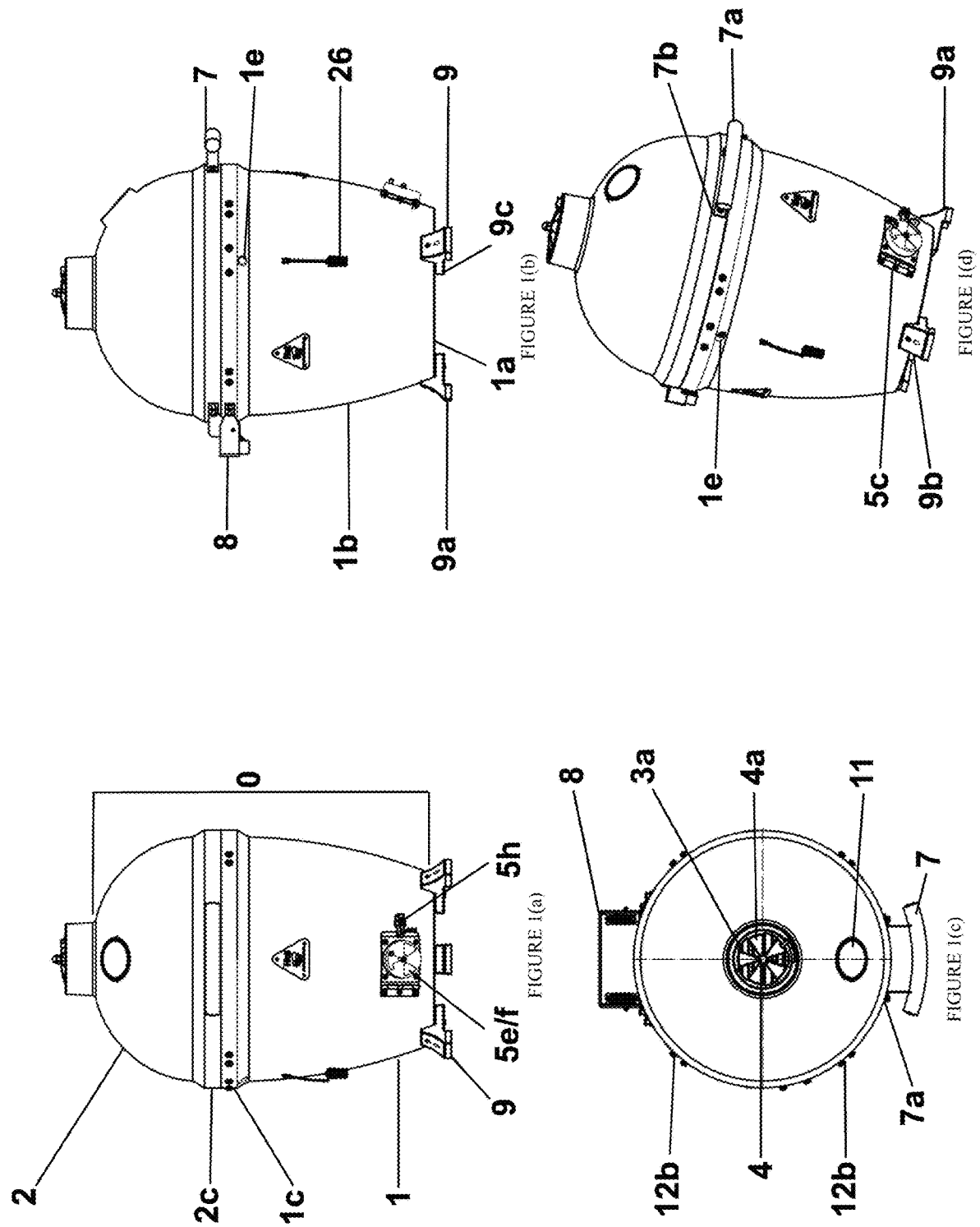

Presented and claimed herein is a cooking apparatus which is a true-ceramic alternative kamado style grill that is more versatile than ceramic kamado style grills because it offers comparable insulation and cooking abilities while addressing and satisfying the common issues with ceramic kamado style grill.

The present disclosure relates, in some embodiments, to a kamado style grill wherein each of the two components defining the cooking chamber, a top unit and a base unit, is crafted of a single cast of metal. More specifically, some embodiments provide a cast aluminum kamado style grill. The use of cast aluminum is particularly promising because it has been found through testing to provide great heat retention despite its conductive properties. Additionally, cast aluminum is a rust resistant, recyclable material, meaning that the final product will be a "greener" product as the term is recognized in the art. Such embodiments may provide for better heat retention at even lower fuel consumption than a ceramic kamado style grill. Such embodiments may also provide a crack resistant shell for the kamado style grill which does not incorporate ceramic materials. Embodiments of the apparatus may also be capable of being drilled, tapped, or otherwise screwed into, thereby allowing external apparatuses to be mounted directly to the cooking apparatus. These external apparatus may include support members such as feet which can prohibit or limit heat distribution onto the external surface on which the base is to rest or other components such as shelving, mounting brackets, thermometers, and vents. Additionally, embodiments may have a hinge system mounted directly to the top and base units of the cooking apparatus, preventing the need for external pressure fit bands which can damage the cooking apparatus or rust over time. Embodiments can be safely shipped either unassembled or pre-assembled. Embodiments may be formed which are uniformly created so that variations are not created during assembly. Embodiments may incorporate a lip in the form of a tongue or groove on either or both the top or base unit to form an at least partially interlocking seal, thereby preventing the need for using expensive gaskets. Moreover, while ceramic kamado style grills can only be used with lump charcoal, embodiments of the present disclosure can also use charcoal briquettes. Likewise, while lighter fluid is unable to be used with most kamado style grills because the chemicals will seep into the ceramic shell, lighter fluid can be used with at least one embodiment of the present invention without concerns that chemicals will be transferred into the aluminum chassis.

Thus, provided is an apparatus for cooking comprising, generally:
 a. a cooking chamber having a high heat capacity wherein the cooking chamber further comprises and is defined by a base unit and a top unit disposed over the base unit;
 b. wherein the base unit comprises a base and a peripheral wall extending upwardly from said base, and wherein the top unit is capable of mating with the upwardly extending peripheral wall of the base unit so as to define the cooking chamber when in a closed position;
 c. wherein the base unit further comprises an adjustable air intake vent and wherein the top unit comprises an adjustable air outlet vent such that air is capable of passing into the cooking chamber through the air intake vent and out of the cooking chamber through the outlet vent when the vents are open;
 d. wherein the top unit and base unit comprise cast aluminum; and,
 e. wherein the top unit is connected to the base unit via a hinge.

In an embodiment, the hinge may be connected directly to the top unit and base unit, eliminating the need for external pressure fit bands.

In multiple embodiments, either or both the top unit and base unit are drilled or tapped to allow for the mounting of external components.

In an alternate embodiment, the cast aluminum may be between 0.5 and 2 inches in thickness. In related embodiments, the cooking chamber may be made of cast aluminum of at least 0.5, 0.75, 1, or 1.5 inches in thickness.

In an embodiment, the top unit comprises a lower edge and the extending wall of the base unit comprises an upper edge, and the lower edge of the top unit contacts the edge of the upwardly extending wall of the base unit when the cooking chamber is closed.

In an embodiment, the edges of the top unit and base unit comprise a tongue and groove which are capable of removably mating so as to create a seal when the cooking chamber is in the closed position. In a related embodiment, the top unit groove sits external to the base unit groove when the top unit is closed. In a related embodiment, the tongue comprises a wall member that extends from the face of the ledge. In related embodiments, the groove is merely the flat surface of the edge adjacent to the tongue. In yet another embodiment, the lower edge has an additional flat surface interior to the lower edge tongue upon which a grate can be placed.

In one or more embodiments, the top unit comprises a thicker region at or near the lower edge and the base unit comprises a thicker region at or near the upper edge of the extending walls, and the hinge is connected to the thicker regions of the top and base units. In a related embodiment, the base unit comprises cast aluminum that is at least one half inch in thickness and the thicker region is at least 1.5 inches in thickness.

In an embodiment, a hole is threaded into the top unit and a thermometer is threaded or screwed into the threading. In alternate embodiments, one or more thermometers can be inserted in other locations such as near the central grate.

In an embodiment, stabilizing feet are fastened to the base unit to provide a stable support for the kamado style grill and to elevate the grill from an external surface allowing for air to pass underneath the base unit and dissipate the heat exerted from the cooking chamber. In a related embodiment, the feet are mechanically fastened through screws or bolts such that the feet are bolted to the grill. In a further related embodiment, the feet have an additional hole that is perpendicular to the base of the feet such that a screw is capable of being vertically driven through the hole and into an external surface such as a table or packaging box.

In alternate embodiments, a charcoal starter is housed within the base unit to aid in igniting the charcoal fuel used in the cooking chamber.

In one or more embodiments, a damper which controls the air exhausting from the cooking chamber is directly connected to the top unit at an aperture in the top unit.

In one or more embodiments, the grill can act as a rotisserie wherein the grill comprises a motor housed external to the cooking chamber that is capable of rotating a rod that is at least partially interior to the cooking chamber on which food can be placed to rotate.

In one or more embodiments, the sidewall of the base unit comprises an access port through which grilling accessories such as a thermometer or rotisserie rod can be inserted. In alternate embodiments, the access port is capable of being controllable sealed. In other embodiments, the access port is capable of being at least partially sealed by a plug when desired by the user. In alternate embodiments, a thermal resistant plug is used. In yet additional embodiments, the thermal resistant plug has a hole in it through which at least one wire connected to one or more thermometer probes can pass so that the thermometer probe can transmit temperature readings out of the unit without allowing substantial heat transfer to exit through the access port. In yet another embodiment, the plug is connected to the chassis of the grill by a connector such as a metal wire of a suitable length to allow the plug to be easily manipulated into and out of the access port while maintaining the attachment of the plug to the grill to prevent heat loss. In yet another embodiment, the plug and access port are both threaded so that the plug can be screwed into and out of the access port. In another embodiment, the access port or ports may be located in areas at or near the same level of the cooking grates so that temperature readings can be obtained near the cooking grate without opening the grill top.

In one or more embodiments, the cooking apparatus comprises an air regulation system further comprising an air intake regulator in the base unit to provide air (and oxygen) to the fire and a damper located in the top unit to regulate the exhaust. In a related embodiment, the intake regulator and damper work in concert to regulate the amount of air that can flow into and out of the cooking chamber, thereby controlling the amount of oxygen available to the fire. In a related embodiment, the top damper comprises a circular solid disc with apertures diametrically similar to apertures in the top unit. The top damper is capable of rotating about a central axis such that the apertures of the top damper can line up with the apertures of the top unit to allow a maximum amount of exhaust. Additionally, the top damper is capable of rotating about the same central axis such that the solid portions of the disc can either partially or fully cover the top unit apertures to limit the amount of exhaust that can exit the cooking chamber, or substantially prevent exhaust from exiting. A person having ordinary skill in the art would recognize numerous embodiments of vent systems that can be employed based on the instant disclosure.

In a related embodiment, the base unit comprises a side wall extending upwardly and outwardly from a base. The side wall further comprises at least one aperture through which air can flow or be pulled into the system to feed the fire. An air intake regulation unit is connected to the base unit at each of the at least one apertures to allow a user to control the amount of air allowed to enter the cooking chamber through the aperture. In one embodiment, the air intake regulatory unit comprises a door member shaped so as to substantially cover the entirety of the aperture in the side wall, wherein the door member has a plurality of apertures that are capable of being controllably sealed or exposed to determine the amount of air that can flow through the door. In a related embodiment, the door member comprises a cylindrical protrusion that extends outwards on the side of the door member external to the cooking chamber, wherein the cylindrical protrusion has an open side and a partially closed side with apertures. At or near the partially closed side with apertures, an at least partially solid disk with matching apertures is rotatably connected so that the disk can rotate about an axis to line up the disk aperture or solid portions with the apertures in the cylindrical protrusion. The at least partially solid disk is capable of rotation about an axis to cover or allow the continued exposure of the apertures in the door member cylindrical protrusion. In a related embodiment, a mesh screen is connected to the door member interior (in relation to the cooking chamber) to the apertures in the cylindrical protrusion to hinder burning embers from escaping through the apertures. In another embodiment, the door member is connected to the side wall via a hinge mechanism that allows the door to pivot outwards from the side wall thereby exposing the side wall aperture. In a related embodiment, the side wall further comprises a locking mechanism that is capable of selectively securing the hinged door member in place against the side wall.

In a related embodiment, the air intake regulation unit is attached to the base unit through attachment means. In alternate embodiments, the attachment means is selected from a group comprising mechanical attachment means such as fasteners, bolts, clips, or screws. In one or more embodiments, the air intake regulation unit is attached to the base unit via a hinge that allows the door component to swing open. In yet alternate embodiments, the attachment means may comprise welding or thermal resistant adhesives.

In additional embodiments, the cooking chamber comprises multiple levels for cooking. One or more sets of ledges or latches can be molded into or securably connected to the interior side of base unit side wall upon which cooking grates can be placed during a cook. For example, in one or more embodiments, a plurality of ledges (preferably at least three) are molded or cast into the interior side of the base unit side wall at substantially the same height from the base. A grilling grate sized to fit within the confines of the base unit but contact and rest on the ledges can be lowered onto and supported by the ledges. In a related embodiment, multiple sets of ledges can be molded into the side walls at various height levels to allow for more than one grilling grate to be employed in the chamber at various levels at the same time or simply to adjust the height at which the cook is desired. In alternate embodiments, the ledges can support a charcoal grate or fire box. It may be desirable for the charcoal to be elevated from the base of the cooking chamber, preferably above the aperture in the side wall of the base unit such that the air intake can flow underneath and into the heated charcoal providing oxygen to the fire. Such an embodiment may also comprise an ash trap underneath the charcoal grate to catch embers and ash that fall through the charcoal grate for easy clean up. In an alternate embodiment, the edge of base unit may further comprise an interior ledge which can support a grill grate as it may be advantageous to cook at that level.

Numerous external components may be attached to the cooking chamber. For example, in multiple embodiments, the cooking apparatus may further comprise a handle connected to the top lid, feet connected to the base unit, a hinge connected to both the top lid and base unit, and side shelves connected to the base unit, to name a few. In various embodiments, the cooking apparatus further comprises thermal insulators such as silicone layers, a carbon fiber washer, or a polyethelyne disk located between the cooking chamber exterior and these external components to hinder heat exchange to the external component. In alternate embodiments, the external components can comprise a thermometer, a handle, a hinge, a shelf, a hinged shelf, a support structure, support feet, a pellet smoker, a smoke box, a charcoal lighter, a light, a flexible light member, a hook such as for mounting grilling utensils, or an automobile mount.

DETAILED DESCRIPTION

As used herein, the term "closed position" or "closed" when used in reference to the top unit or any components thereof, refers to the position of the top unit when it is in contact with the base unit or any component thereof so as to define a closed cooking chamber.

As used herein, the term "open position" or "opened" when used in reference to the top unit or any components thereof refers to the position of the top unit when it is not in contact with the base unit, allowing access to the interior of the cooking chamber.

The subject matter of the present invention is described with specificity herein to meet statutory requirements. However, the description itself is not intended to necessarily limit the scope of claims. Rather, the claimed subject matter might be embodied in other ways to include different components or combinations of components similar to the ones described in this document, in conjunction with other present or future technologies. Furthermore, the described features, structures, or characteristics may be combined in any suitable manner in one or more embodiments.

A cooking apparatus is provided herein comprising generally, a kamado style cooking chamber for use in charcoal grilling that is comprised of cast aluminum allowing the cooking apparatus harnesses the versatility of kamado style grills while solving one or more of the issues that conventional kamado style grills face. As depicted, the cooking apparatus comprises a cooking chamber defined by a lower chamber comprising an adjustable air regulation system wherein air can be controllably allowed to enter into the lower portion of the cooking and controllably exhaust through the lid when the cooking chamber is closed, one or more cooking grates, a handle, support structures, and an ash-trap.

Turning first to FIGS. 1-8, an embodiment of a cooking apparatus is shown in various stages of configurations. The chassis of cooking apparatus is a cooking chamber 0 defined by a base unit 1 connected to a top unit 2 by hinge 8 in such a manner that top unit 2 is generally disposed above base unit 1 and is capable of moving between open (FIGS. 2, 4, and 6) and closed (FIGS. 1, 3, and 5) positions relative to the base unit 1. It is often desirable to cook and store the grill while in a closed position, but it is necessary to access the inner chamber. To accommodate these configurations, top unit 2 acts as a lid to the partial chamber that is capable of pivoting between an open and closed position relative to the base unit 1 along the axis of hinge 8.

Working from the bottom of the chamber upwards, base unit 1 is a housing unit comprising a circular base 1a and a base side wall 1b extending upwardly from that base to define the lower portion of the cooking chamber 0. The depicted base unit 1 is formed from a single cast of metal and houses and defines the fire box 18, i.e., the area in which the charcoal, wood, or charcoal briquettes (each a "fuel") are loaded and lit on fire to produce heat for the cooking chamber 0 when ignited. The term "fire box" may either refer to a general area in the interior of the base unit or a component within the base unit, depending on the embodiment. One benefit of the present invention is that in one or more embodiments, a separate fire box housing may not be necessary because the construction of the base unit may provide sufficient insulation from the burning of the fuel without the need for another insulating layer to prevent direct contact to the outer chamber. This is in staunch contrast to traditional kamado style grills that require an interior fire box housing to localize the flame and provide additional insulation. In some configurations, the base unit 1 also houses at least one cooking grate on which food is placed for cooking.

Figure 2:
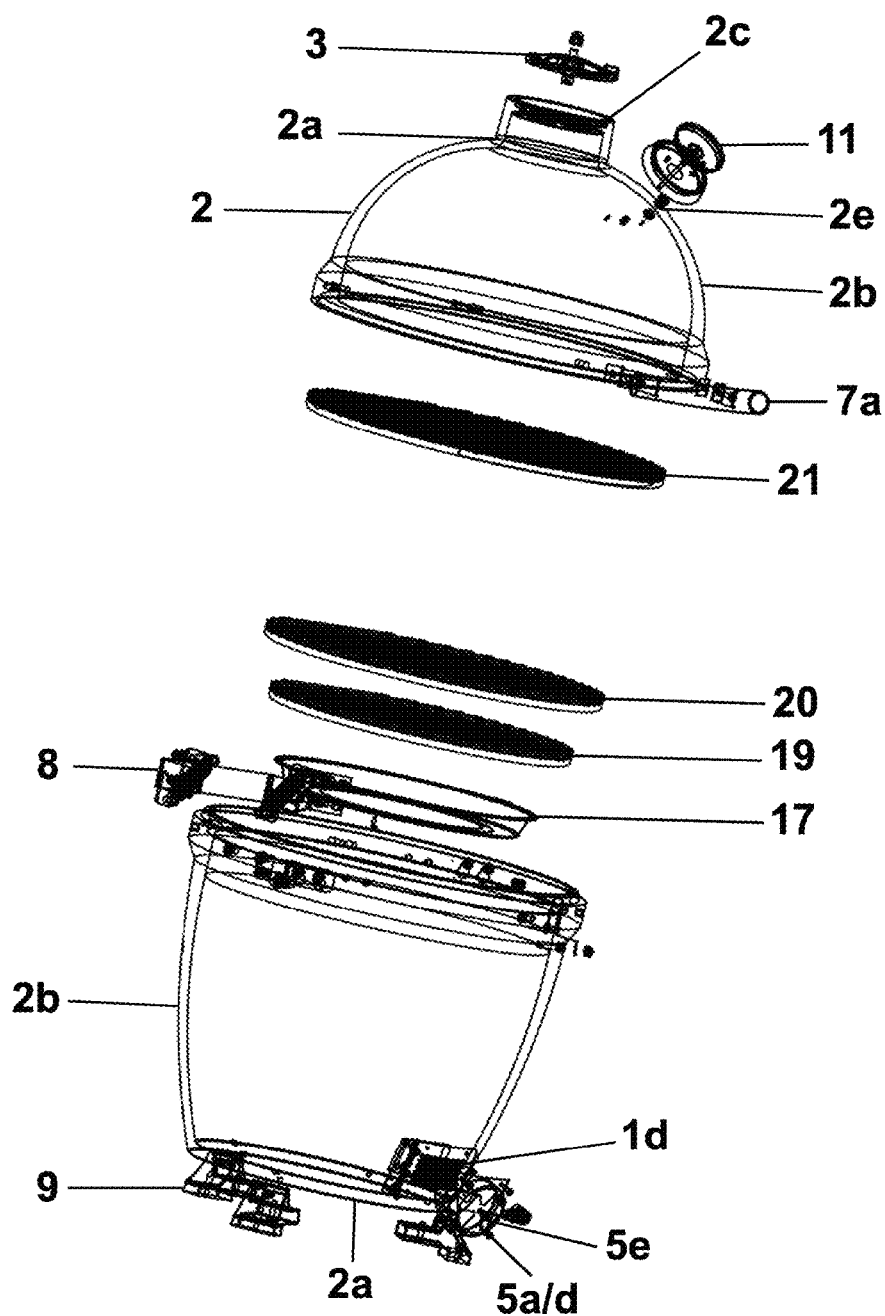
FIG. 2 is an exploded isometric view of the components comprising the embodiment of the cooking apparatus as in FIG. 1.
Figure 3F:
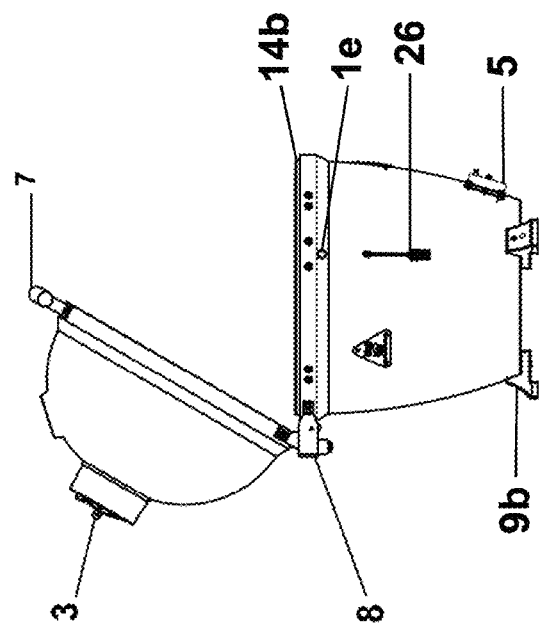
Figure 3E:
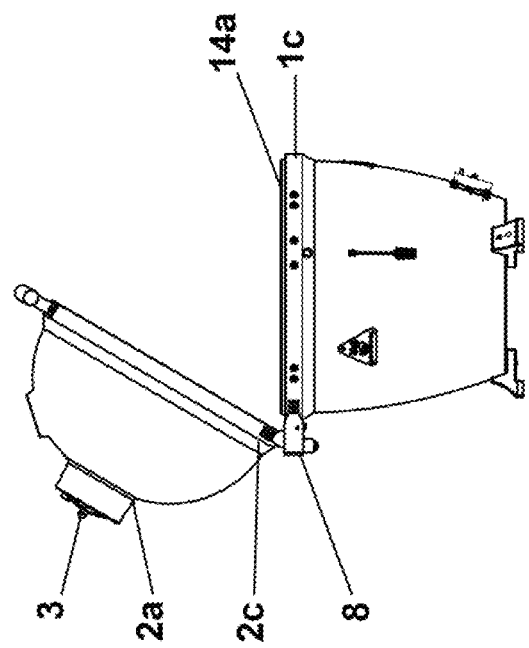
Figure 4A:
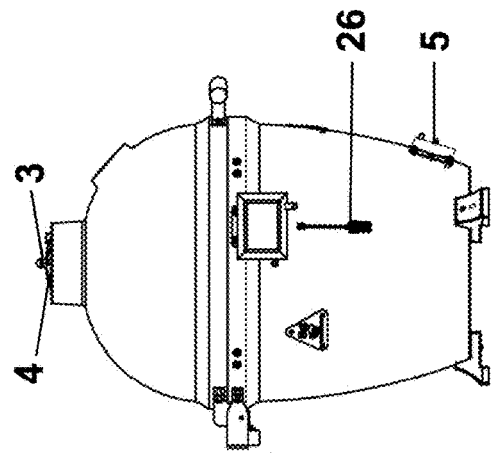
FIGS. 4(a) through 4(d) show an embodiment of the cooking apparatus in a closed configuration wherein a rotisserie motor is mounted to the cooking apparatus with a rotisserie rod extending through the access port in the side wall of the cooking apparatus into the cooking chamber.
Figure 4B:
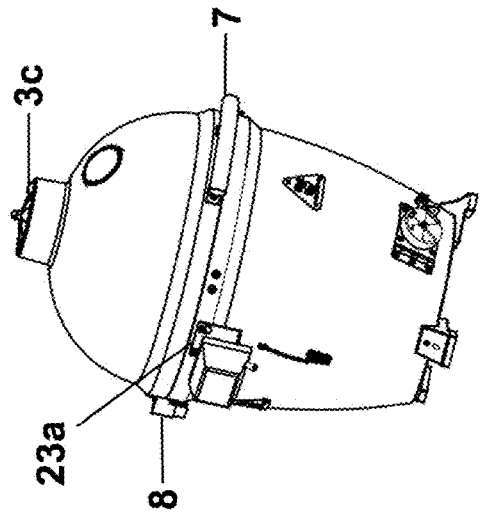
Figure 4C:
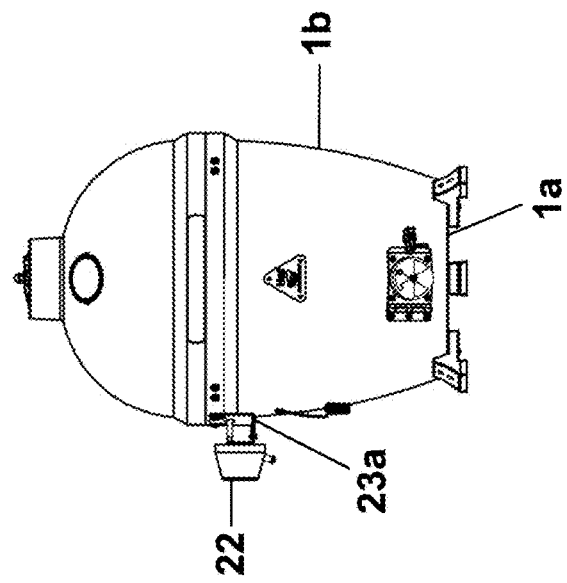
Figure 4D:
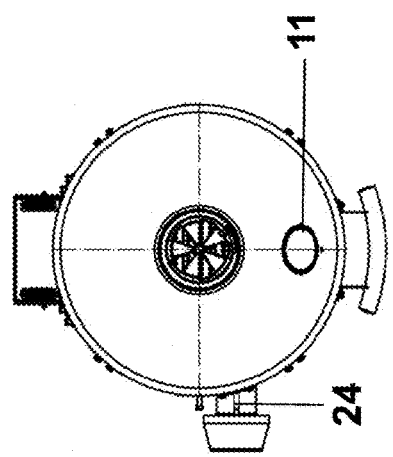
Figure 5A:
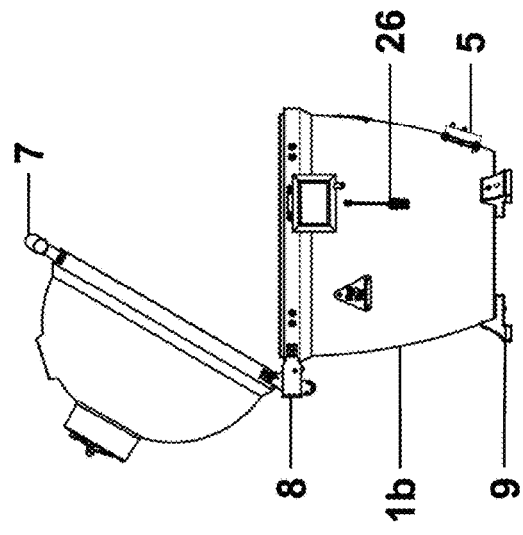
FIGS. 5(a) through 5(d) show the same embodiment as in FIGS. 4(a) through 4(d) wherein the cooking apparatus is in the open position.
Figure 5B:
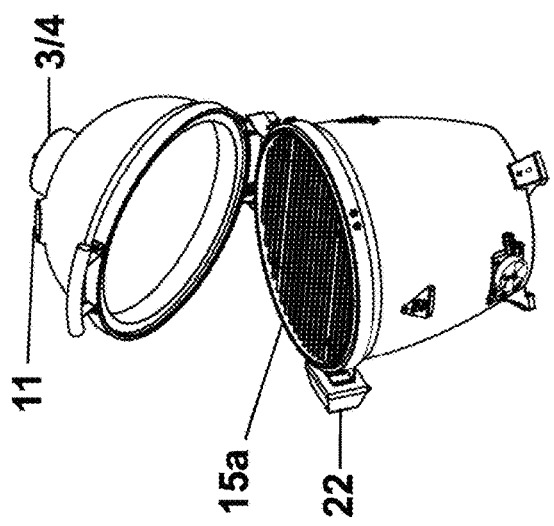
Figure 5C:
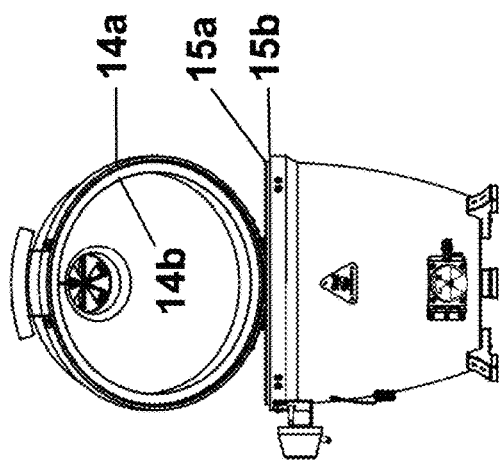
Figure 5D:
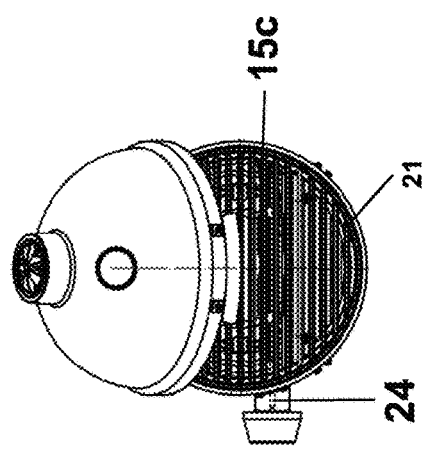
Figure 6A:
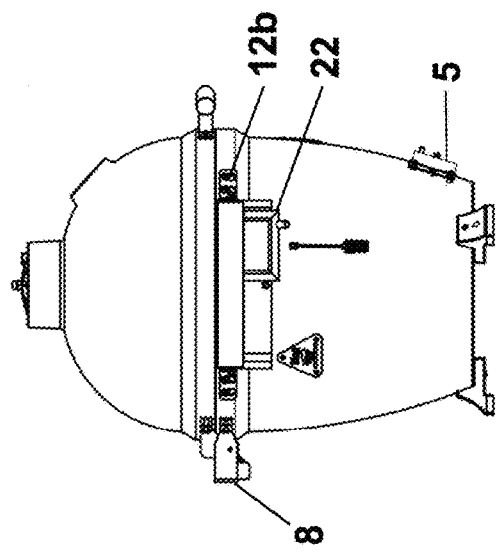
FIGS. 6(a) through 6(d) shows the same embodiment as in FIGS. 4(a) through 4(d) wherein side shelves are mounted onto the cooking apparatus.
Figure 6B:
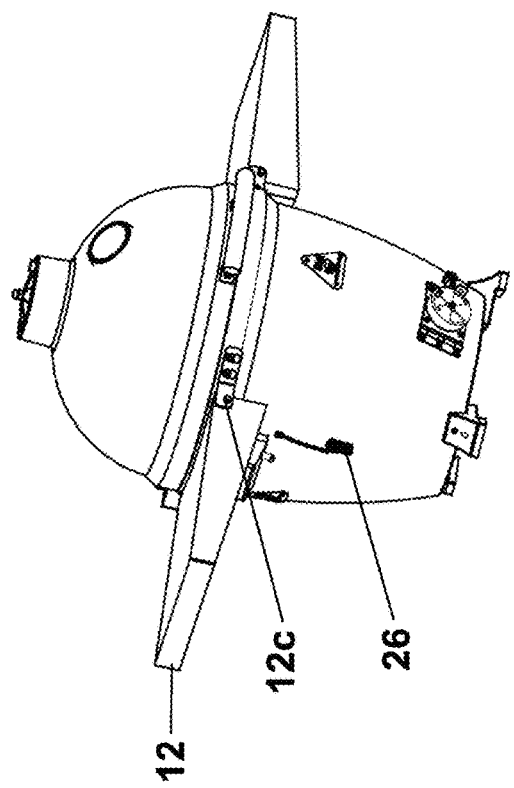
Figure 6C:
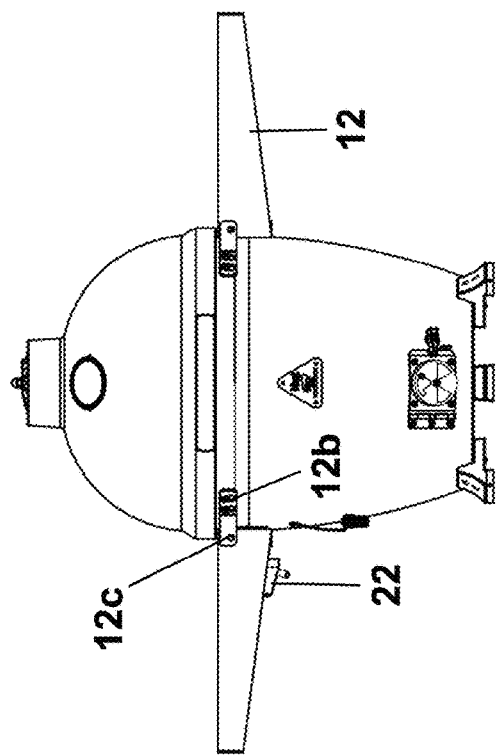
Figure 6D:
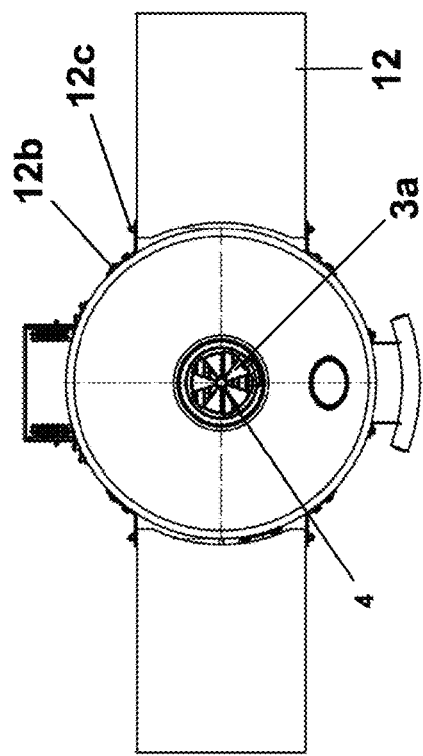
Figure 7A:
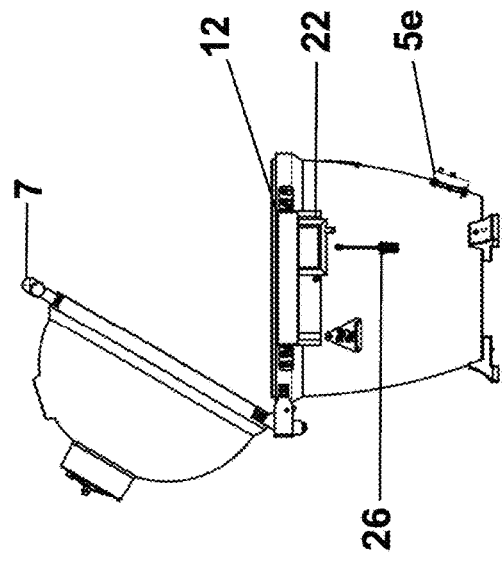
FIGS. 7(a) through 7(d) show the same embodiment as in FIGS. 6(a) through 6(d) wherein the cooking apparatus is in the open position.
Figure 7B:
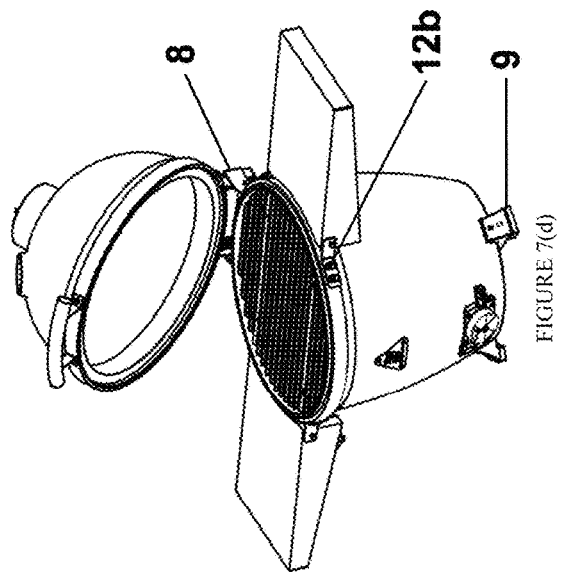
Figure 7C:
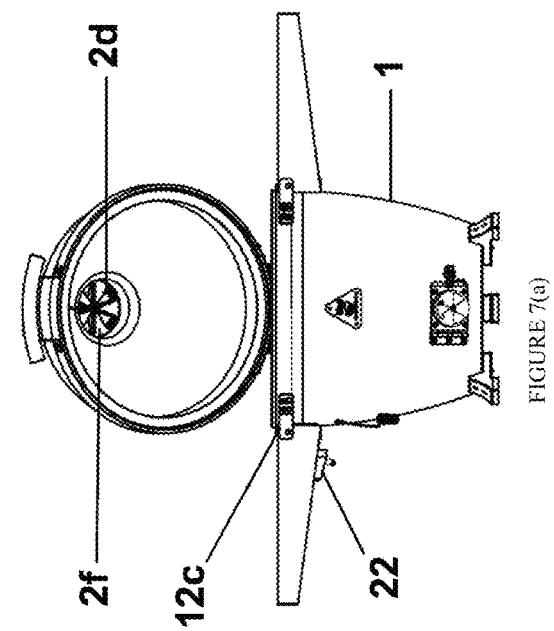
Figure 7D:
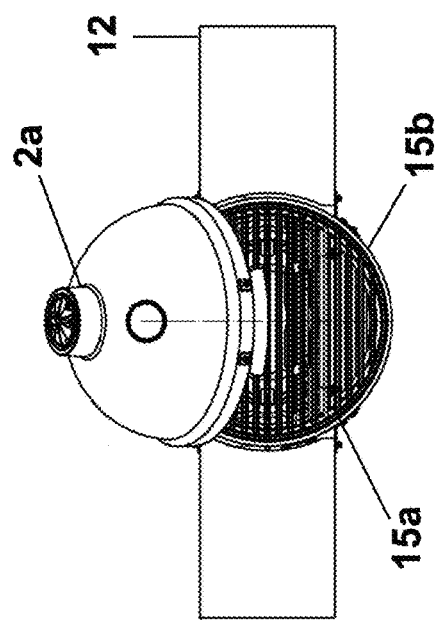
Figure 8:
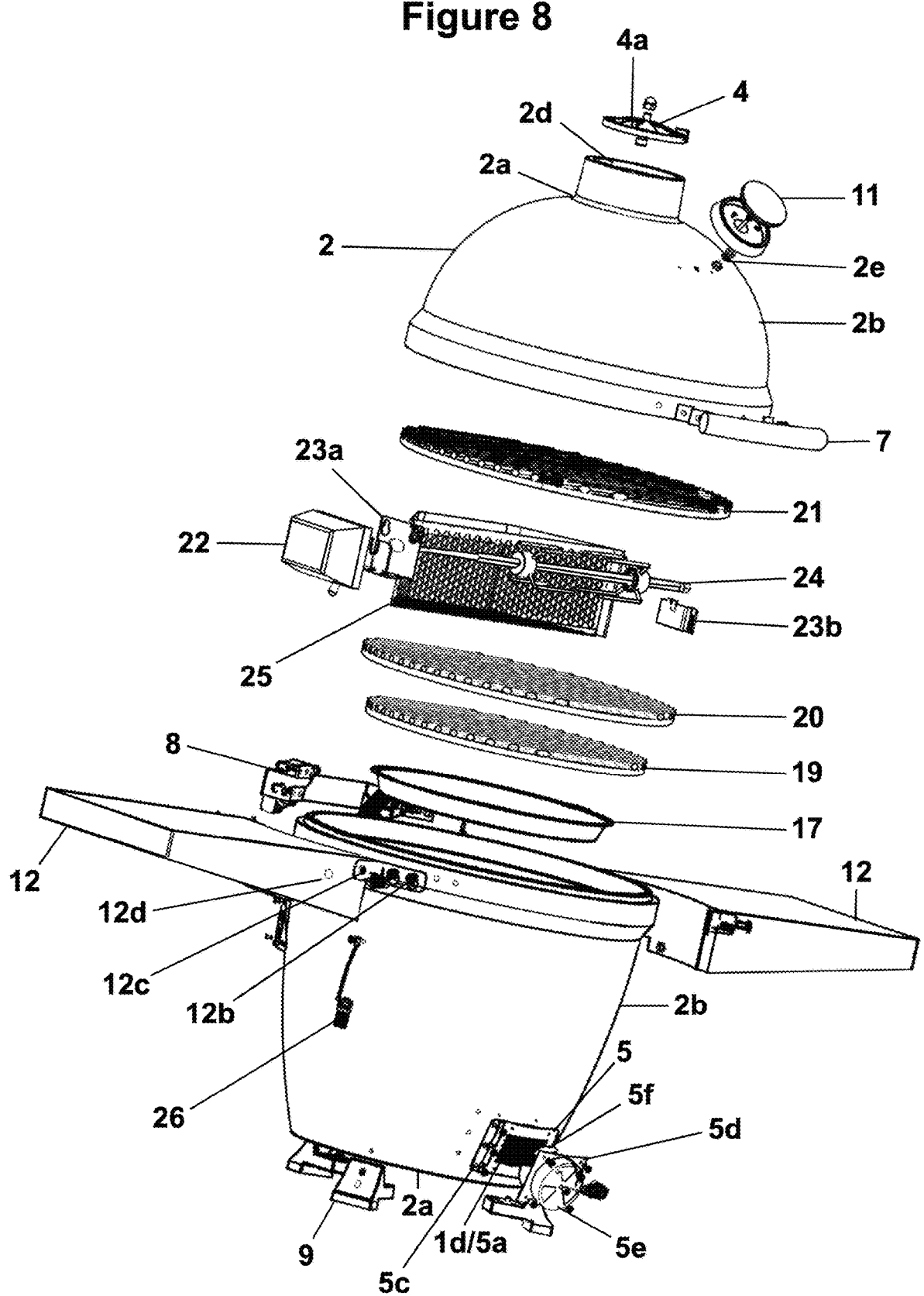
FIG. 8 is an exploded isometric view of the components comprising the embodiment of the cooking apparatus as in FIGS. 6 and 7.

As depicted, base unit 1 comprises circular base 1a, base side wall 1b, base hinge component 1c and base unit edge 15. Turning briefly to FIGS. 2 and 8, base unit 1 is shown to comprise a circular base 1a that defines the lower extremities of the cooking chamber 0 upon which the remainder of the cooking chamber 0 rests. Circular bases have shown great promise for aiding in the circulation of heat. Additionally, the use of a circular base, as opposed to other shapes, minimizes edges and other crevices in which ash or drippings can fall and build up, thereby facilitating an easier clean up. While the base is described herein as circular in shape, it is possible that other shapes could be utilized, some of which may have their own advantages, such as ovular, square, rectangular, triangular, or any other shape capable of providing stability.

Turning to Figures 1and 2, base side wall 1b comprises a frustoconical shaped wall that extends upwardly in an outwards manner from circular base 1a to define the side parameters of base unit 1. On one end, base side wall 1b contacts and is attached to circular base 1a, defining the bottom portion of the lower chamber. Base side wall 1b extends outwardly and upwardly in a frustoconical shape from circular base 1a towards the opposing end, which is an open end through which access is granted to the recess cavity defined by the base unit 1. The open end of base side wall 1b opposite circular base 1a further comprises lower edge 15 which comes into contact with the top unit 2 when the cooking chamber 0 is in the closed position. The base unit 1 is said to be frustoconical in shape as depicted because the radius of the base is smaller than the radius of the open end opposite the base. As depicted, the side walls extend upwardly and outwardly from the base to account for the diametrical increase between the base and the open end. It may be preferred, although not necessary, that the increase is gradual over the height of the base unit. Alternate embodiments are possible that do not employ such geometry; for example, it is possible that the base unit may be substantially cylindrical or barrel-shaped.

Figures 14A, 14B:
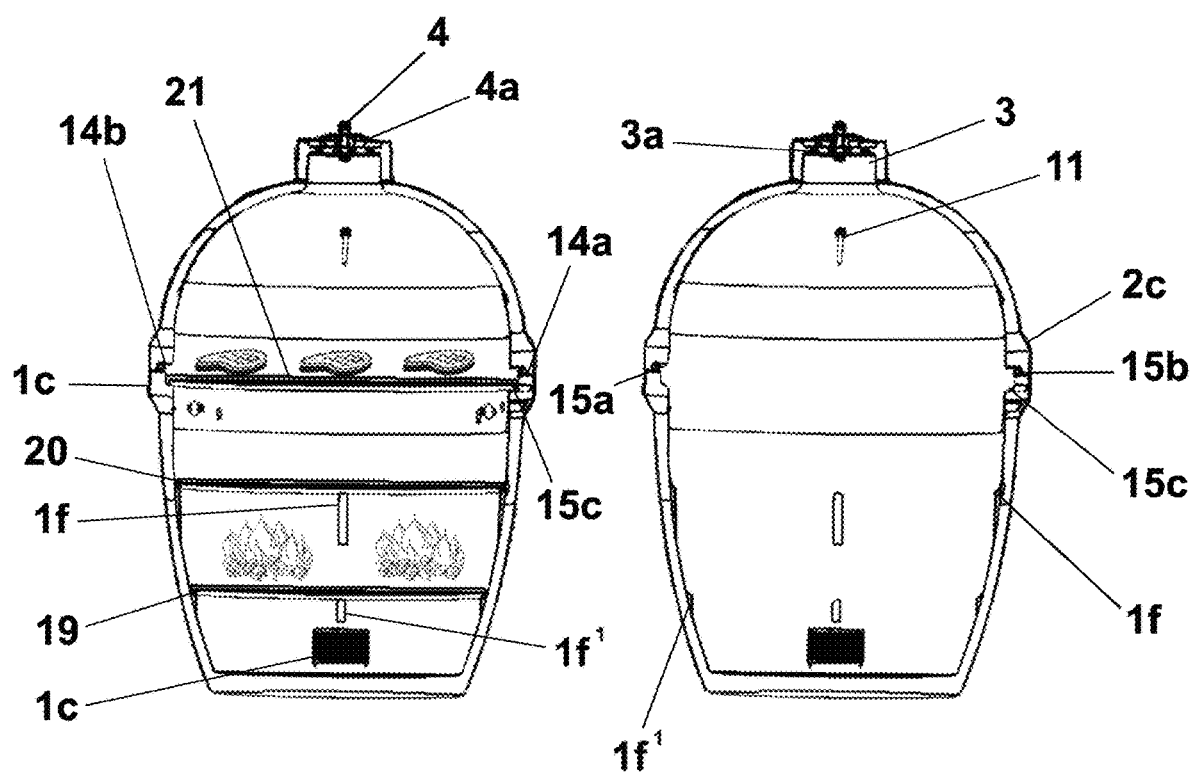
FIGS. 14(a) and (b) are each a cross sectional view of the embodiment of FIG. 1 showing the "zones" within the base unit wherein grates are included in 14(a) and removed in 14(b).

For illustrative purposes, it can be said that the base unit 1 is separated into different zones such as a fire box where the fuel is ignited and burns to provide heat to the cooking chamber, a cooking zone on top of the fire box 18, and an ash catching zone underneath the fire box 18 in which burnt fuel ash can be collected, although in reality they often comprise a single cooking chamber. As depicted, ash trap chamber 16 occupies the lowest interior zone of base unit 1, below the fire box 18. In one or more embodiments, such as the embodiment depicted in FIG. 14, ash trap chamber 16 is not defined by its own distinct set of walls, but instead comprises the area of the base unit 1 below the firebox 18 into which burnt ash can fall for collection. It is important for burnt fuel to be removed from the stockpile of fuel that has not yet been depleted. For example, when using charcoal, the existence of burnt ash can prevent further burning by either acting as an insulator that prevents heat from igniting non-depleted charcoal or by preventing proper circulation of air to the flame which would hamper or extinguish the fire. As depicted, ash trap tray 17 is located within the ash trap chamber 16 zone and comprises a container with a base, a side wall and an open end opposing the base facing the fire box 18. As will be discussed in greater detail below, air flows through the air vent aperture 1d in base side wall 1b into ash trap chamber 16. From ash trap chamber 16, the air is capable of passing into fire box 18 so as to provide necessary oxygen for the burning fire. To keep and prevent the clogging of airflow, burnt ash falls from the fire box 18 into the ash trap chamber 16 allowing air to flow to the fire and undepleted fuel. In one embodiment, the open end may have a perforated ash separator (not depicted), which is a sifting device that only allows ash or charcoal below a certain size to fall into the ash trap chamber 16.

As previously indicated, fire box 18 is the zone where fuel is located and burned to generate the heat required for cooking. In the depicted embodiment, fire box 18 is located above the ash trap chamber 16 so that the burnt ash can passively fall into the ash trap tray 17 for collection and eventual removal. The lower extremity of fire box 18 is marked by charcoal grate 19 which comprises a perforated metal disk upon which charcoal can rest. In alternate embodiments, charcoal grate is a simple grate such as would be used for grilling. It is preferable that the charcoal grate 19 is diametrically sized to fit the confines defined by the base side wall 1b at a desired height without allowing for a substantial gap between the outer edges of the charcoal grate 19 and the interior of the base side wall 1b in which charcoal can fall. Numerous configurations are envisioned for charcoal grate. It is advisable that the perforations are sized to allow for adequate airflow without allowing too much fuel to fall through the perforations. Because heat rises, the cooking zone is located above the fire box 18 and can extend upwards into the top unit 2 depending on the particular configuration.

Figure 13:
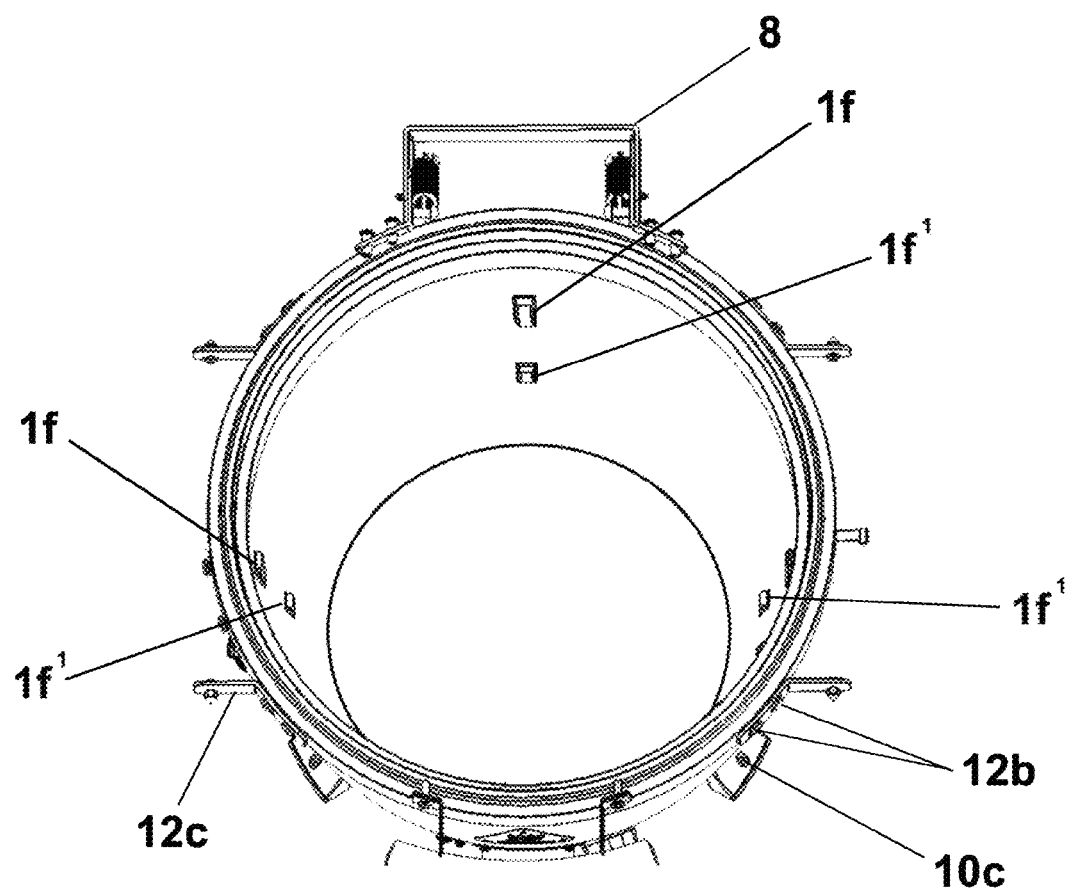
FIG. 13 is an top view looking down through the top unit showing an interior view of the bottom unit of the cooking chamber to illustrate molded ledges upon which grates can be supported for cooking.

The interior side of base unit 1 further comprises grate support means for holding the various grates in position. As depicted, grate support means comprise one or more sets of ledges 1f that can be molded into or securably connected to the interior side of base unit side wall 1b. In alternate embodiments, the ledges may be latches, pegs, ridges or other support structures upon which the grates can catch. Because the cooking chamber 0 is made of cast aluminum, the grate support means 1f can either be molded directly into the interior base side wall 1b or they can be mechanically or chemically attached such as by fusion, welding, adhesives or mechanical fasteners such as screws and bolts and the like. This demonstrates an important example of the cooking apparatus' versatility as the grill can be set up to move the grates or charcoal fuel to different levels as desired by the user. By way of illustrative example, FIG. 13 shows two sets of support means ledges 1f and 1f', each comprising a plurality of ledges that are each molded or cast into the interior side of the base unit side wall 1b at substantially the same height from the base unit 1. It is preferable that each ledge 1f' is spaced out in a manner to evenly support the grates in a substantially planar manner. To accomplish this, a number of configurations can be employed, but it may be preferable that three or more ledges are employed to evenly balance the grate.

As depicted, the first set of ledges 1f is lower in the cooking chamber 0 such that the top surface of each ledge 1f is located at the base of the fire box 18 zone. Middle charcoal grate 19 is diametrically sized to fit within the interior chamber of base unit 1 and supported on each of the ledges 1f. A second set of ledges 1f' is located above the fire box 18 such that the top surface of each ledge 1f' is located at the base of the cooking zone. A middle grate can be lowered onto the ledges 1f' that is also sized to fit within the confines of the base unit 1 but contact and rest on the ledges 1f'. These examples are provided purely for illustrative purposes; it is understood that the cast aluminum nature of the base unit allows for multiple sets of securing means to be located at various heights. For example, in alternate embodiments, a plurality of vertical mounting brackets each comprising a plate with one or more notches or peg holes extending down the bracket can be attached to the interior side of the side wall allowing a user to insert pegs and catches at desired heights to support a grate.

Top unit 2 defines a lid which is typically disposed above the lower chamber defined by base unit 1. Top unit 2 comprises a dome shaped top wall 2b which extends downward from the crown 2a of the dome shaped top wall 2b towards upper edge 14. At or in the crown 2a is an aperture 2c which is used to vent air from the cooking apparatus when the top unit 2 is in the closed position. As will be discussed in greater detail below, top outlet vent 3 is attached to the top unit 2 at aperture 2c to adjustably control the flow of air (exhaust) out of the cooking apparatus. This, in turn, helps control the amount of air capable of entering the cooking chamber 0 to provide further fire control. Aperture 2c can comprise a variety of shapes. As depicted, the crown 2a is a cylindrical extension that extends upwards from the center of the dome shaped top wall 2b so as to form a tunnel through the top unit 2. Because the cooking apparatus as depicted is constructed of cast aluminum, crown 2a is molded directly into the dome shaped top wall 2b on one end. In alternate embodiments, the crown 2a can be connected or welded to the top unit 2. However, casting the components as a unitary structure is advantageous in some embodiments as it keeps a tighter seal on the cooking chamber 0. A plurality of wedge-shaped top apertures 2c are formed as gaps in the opposite side of crown 2a (the outer or top most side not connected to top unit 2). As depicted, a plurality of crown wedge apertures 2c are evenly spread along the top of crown 2a with equally sized solid wedge members 2f separating the apertures 2c.

An additional thermometer aperture 2e can be formed in a suitable location in dome shaped top wall 2b so that a thermometer 11 can be inserted. It is preferable that the thermometer aperture 2e is just slightly diametrically larger than the diameter of the thermometer rod that will be inserted so as to not allow a substantial amount of heat or air to escape from the thermometer aperture 2e when thermometer 11 is inserted. One way to decrease the heat or air leakage through thermometer 11 is to thread the thermometer aperture 2e, thereby allowing thermometer 11 with corresponding threading to be screwed inserted into the thermometer aperture 2e, creating an at least partial seal.

In the embodiment as shown and described, the base unit 1 and the top unit 2 each comprise a single layer of cast aluminum. It must be remembered that aluminum is a conductive material so it would not typically be considered for use in a kamado style grill. Numerous aluminum alloys can potentially be used. For example, the cast may be ZL101, ZL104, or ZL101-ZL104 alloys of aluminum, which generally have a melting temperature above 1200 degrees Fahrenheit. When using aluminum alloys, it is preferable that the cooking apparatus be constructed of a suitable thickness such that it is capable of providing proper insulation without incurring too much weight. As depicted, the thickness of the cast aluminum is between 0.5 and 2 inches. It may be preferable in some applications that the cast aluminum is substantially uniform in thickness throughout the cooking chamber 0 to create an even layer of insulation. However, an exception to this exists in embodiments where additional support is desired to compensate or account for the pressure exerted between the top unit 2, base unit 1 and the hinge 8. Thus, it is possible that in one or more embodiments, the top unit 2 and the base unit 1 may further comprise top hinge connector 2c and base hinge connector 1c, which are areas of thicker walling near upper edge 14 and lower edge 15 that extends around the top unit 2 and base unit 1. Hinge 8 may be connected, either through mechanical connection means (i.e., bolts, screws, fasteners, and the like), thermal welding, or chemical attachment means (i.e., adhesives), directly into these thicker areas, thus distributing the tension better around the cooking apparatus when opening or closing the lid. For example, it may be desirable to create a cooking apparatus such as the one described herein that comprises one inch of cast aluminum throughout substantially all of the top unit 2 and base unit 1 except for the area around upper edge 14 and lower edge 15 which will each comprise a 1.5-2 inch thick portion referred to as top hinge connector 2c and base hinge connector 1c to compensate or account for the weight and pressure of moving the top unit 2 in relation to base unit 1. Thus, the depicted embodiment allows for the hinge mechanism to function without the need for external bands. However, in alternate embodiments, it is possible for external bands to be used without issue because the bands will not crack or cause structural stress on the cast aluminum body.

A handle 7a is mounted onto the top unit 2 so as to aid in the user's manipulation of the top unit 2 into the open or closed positions in relation to the base unit 1. As depicted, handle 7a is mechanically mounted through handle mounting means 7b into top hinge connector 2c at a location substantially opposite hinge 8 to allow for maximum torque. As depicted, the handle 7a comprises an elongated shaft transversely connected on each end to a handle mounting bracket 7b, which is capable of receiving a screw recessed through the dome shaped top wall 2b. Additionally, a thermal insulated buffer can be applied between the cooking apparatus and the handle 7a to prevent heat diffusion. For example, a silicon pad can be employed between the external side of dome-shaped top wall 2b and the handle mounting bracket 7b in a manner similar to a washer. In alternate embodiments, an actual washer may be employed that is constructed of a non-conductive or minimally conductive material such as carbon fiber. In a related embodiment, the washer may be coated with or used in conjunction with a separate component that acts as a thermal insulated buffer such as polyethylene or silicone.

Fire results when three components come together: fuel, heat energy, and an oxidizing agent, generally in the form of oxygen from the air. The kamado style grill uses a combustible fuel. Unlike its predecessor kamado style grills, however, the present Cooking Apparatus is not limited to lump charcoal as the metallic interior will resist the absorption of chemicals or components from the fuel overtime whereas ceramic or quasi-ceramic (in the case of grills which incorporate an interior ceramic layer within metal casings) grills will absorb these chemicals and clog the pores in the ceramic. Indeed, numerous forms of charcoal, including charcoal briquettes or the various forms of lump charcoal may be used as a suitable fuel with the present apparatus.

Fire is the rapid oxidation of a material (the fuel) in the exothermic chemical process of combustion, releasing heat, light, and various reaction products. Typically with combustible fuels heat only has to be introduced initially to the fuel in the form of a starter or igniter in order for the fuel to reach its ignition point where flames are produced. As long as there is ample oxygen present, the heat typically spreads through the available fuel, igniting and burning the additional fuel over time. The heat may be introduced into the fuel in numerous forms well known in the art including various fire starters of both chemical and mechanical means. However, embodiments of the present Cooking Apparatus allow for two new means that are typically unavailable to other kamado style grills. First, because the metallic shell will not absorb chemicals like a ceramic shell, lighter fluid can be used without imparting a lasting flavor onto the food. Second, the metallic shell allows for igniters (not depicted) such as charcoal starters to be built and mounted directly into the cooking chamber 0. Additionally smoke injectors such as from burning pellets can be mounted directly onto and connected into the cooking chamber. To do so, these accessories can either be placed within the cooking chamber, or mounted externally to the cooking chamber whereby a component will traverse into the cooking chamber or a conduit will connect the accessory to the access port.

In order for the fuel to burn and generate heat, an oxidizer agent, such as oxygen gas, is required. With grills, oxygen is typically introduced from the ambient atmosphere in a regulated manner, allowing for the control of the amount of oxygen which is introduced into the Cooking Apparatus to fuel the fire. The Cooking Apparatus comprises an adjustable ventilation system capable of regulating the amount of oxygen and ambient air that can be introduced into the cooking chamber 0. The adjustable ventilation system comprises generally an adjustable air intake vent 5 and an adjustable top air outlet vent 3 which work in concert to regulate the air flow into and exhaust from the heat source, i.e., the fire.

Adjustable air intake vent unit 5 comprises a vent door 5a with an opening, a hinge body 5c, and mounting components 5b through which the vent door 5a is mechanically mounted or fused such as by welding to the base side wall 1b through hinge body 5c. As depicted, the adjustable air intake vent unit 5 comprises a door member shaped so as to substantially cover the entirety of the air vent aperture 1d in base side wall 1b. The vent door member 5a has a plurality of apertures that are capable of being controllably sealed or exposed by a sealing member to determine the amount of air that can flow through the vent door 5a. The vent door member 5a comprises a plate that is shaped to cover air vent aperture 1d. The vent door member 5a further comprises an air intake conduit 5e which is a cylindrical protrusion that extends outwards on the side of the door member plate external to the cooking chamber 0, wherein the cylindrical protrusion has an open interior side and a partially closed exterior side with apertures. The apertures comprise a plurality of wedge apertures that are evenly spread along exterior side of air intake conduit 5e with equally sized solid wedge members separating the apertures. An at least partially solid disk circular pin-wheel apparatus 6 with corresponding apertures and solid areas is rotatably connected to the air intake conduit 5e. As depicted, the disk circular pin-wheel apparatus 6 is attached on the inside of the air intake conduit 5e, although it could be attached externally. The user can rotate the disk circular pin-wheel apparatus 6 about an axis in a pin-wheel like fashion so that either a portion of the solid wedges or the wedge apertures align with the apertures of the air intake conduit 5e, thereby at least partially covering or exposing the apertures to control the amount of air that can flow into the air intake conduit 5e from the ambient atmosphere. To allow for the internal disk to be manipulated, a handle 6a protrudes from the disk circular pin-wheel apparatus 6 through an air intake conduit 5e aperture. An air intake conduit notch 5e in an aperture is shown that can catch the handle 6a, thereby preventing disk circular pin-wheel apparatus 6 from rotating either past full open, full closed, or both. A mesh screen 5g is also connected to the door member interior (in relation to the cooking chamber 0) to the apertures in the cylindrical protrusion to hinder burning embers from escaping through the apertures.

It may be desirable to access the contents of the ash trap chamber 16 to clear the buildup of ash during or after a cook without removing the charcoal or cooking grates. In order to accommodate access to the ash trap chamber 16, door member 5a is connected to the base side wall 1b via a hinge body 5c or other hinge mechanism that allows the door member 5a to pivot outwards from the base side wall 1b thereby exposing air vent aperture 1d. A user can use an ash tool to remove the ash and refuse from the ash trap chamber 16 that may otherwise impede air flow into the fire box 18. This may also be desirable, for example, upon ignition of the fire to allow the maximum amount of air to enter the cooking chamber 0. A locking mechanism 5h, which is a rotatable latch, is employed to controllably secure the hinged door member 5a in place against the base side wall 1b.

In one or more embodiments, the air vent aperture 1d is located in the base side wall 1b at a location such that air passes from the ambient atmosphere into the ash trap chamber 16 (not depicted), which is separated from the fuel by charcoal grate 19. Numerous means exist for providing a regulated vent by adjusting the opening or aperture through which air is capable of entering the system. For example, as depicted, a circular pin-wheel apparatus like disk 6 is mounted onto vent door 5a through a rotatable bracket in a manner that it is capable of moving along the rotatable bracket. Thus, the circular pin-wheel apparatus 6 is capable of moving between a position wherein it substantially covers the one or more apertures in vent door 5 when it is in the closed position to a completely open position wherein it does not cover any of the at least one or more apertures. It likewise can be moved to any number of positions in between, thereby regulating the amount of air capable of passing into the system. In practice, the existence of a fire above the air intake will cause a negative pressure or vacuum, whereby air will be sucked into the system through the one or more apertures when the vent is in an open position. Additionally, it is possible that circular pin-wheel apparatus 6 may become hot when the Cooking Apparatus is in use. Therefore, in order to safely handle the circular pin-wheel apparatus 6, a handle 6a can be attached to the circular pin-wheel apparatus 6 which is coated in a heat resistant material, thereby protecting the user from the heated vent system.

Because the cooking apparatus comprises a substantially closed system (by "closed system" in this context it is meant that when the top unit 2 is in a closed position, a majority of the air passes into the system through the adjustable air intake vent 5 and out the top outlet vent 3), the top outlet vent 3 regulates the amount of air or exhaust that is capable of venting from the system and back to the ambient atmosphere. Trading on the premise that heat rises, top outlet vent 3 is the only outlet that is primely located to allow a substantial amount of air to escape the system when the top unit 2 is in the closed position. This is particularly important because air cannot enter a controlled system without air escaping. Thus, in order for new air to enter through adjustable air intake vent 5 and be exposed to the fire, an equal amount of exhaust must exit through top outlet vent 3. Turning back specifically to FIG. 1, a top outlet vent 3 is shown which is molded directly onto a top aperture 2d in the crown 2a of the top unit 2. Although depicted in the crown 2a, it is possible that one or more top apertures may be located in the top unit 2 to act as a top outlet vent 3. Additionally, although the top vent unit is molded directly into the top unit 2, it could be an external component which is attached or set onto the Cooking Apparatus. Molding or fusing the top outlet vent 3 onto the top unit 2 has shown great advantages which could not be realized in other kamado style grills. By way of illustrative example only, permanently attaching the top outlet vent 3 to the top unit 2 eliminates a leaking point for the air thereby aiding the vent system.

Prior kamado style grills would only use removable external vent components that were friction fit or gravity fit onto the grill. Because they could not be welded on, a gap would always exist between the grill dome and the vent, preventing a substantial seal form being formed. This also created an opportunity for the vent system to become dislodged from the cooking unit when the top is opened creating a hazard or damaging the unit. The intact system cures this issue by allowing a permanent incorporation of the top vent components.

Top outlet vent 3 has one or more top apertures 3a to allow for air to exit from the cooking apparatus into the ambient atmosphere. In order to regulate the amount of the air capable of passing out the system, the top vent system also comprises an adjustable top sealing component 4 in the form of a damper as would be recognized by one having skill in the art which acts externally to close the top apertures 3a, restricting the flow of air out of the system. As depicted, top sealing component 4 is damper similar to a daisy-wheel with gaps 4a that substantially line up with and correspond with the top apertures 3a. The top sealing component 4 is capable of being manipulated such that the top apertures 3a can be exposed or substantially sealed from the ambient atmosphere as desired by the user by either lining up the daisy wheel with gaps 4a or wedges of the top sealing component 4 with the top apertures 3a. In various embodiments, the damper can be allowed to freely rotate around the connection point. In other embodiments, the a catch may be installed to only allow the damper to rotate between completely open ventilation to substantially sealed. In other embodiments, a handle may be coupled to the damper which may or may not be used in the catch means. In yet other embodiments, the handle may be coated in a thermal resistant material.

The vent system optimally works with cooking apparatus that is substantially closed system when the top unit 2 is in the closed position. Thus, it is imperative that the edges of top and base units 1 and 2 (i.e., upper edge 14 and lower edge 15) are capable of forming an at least partial seal when in the closed position to define the cooking chamber 0. In a typical kamado style grill, the upper edge simply rests upon the lower edge when the top is in the closed position. This leaves a gap between the two through which air can escape or enter. In order to account for such gaps, a gasket typically made of felt, Kevlar or neoprene is placed on the exterior side of the top and lower edges. These gaskets come into contact and substantially seal gaps between the top and bottom. However, gaskets are prone to scorching and must be replaced though normal wear and tear.

Figure 10A:
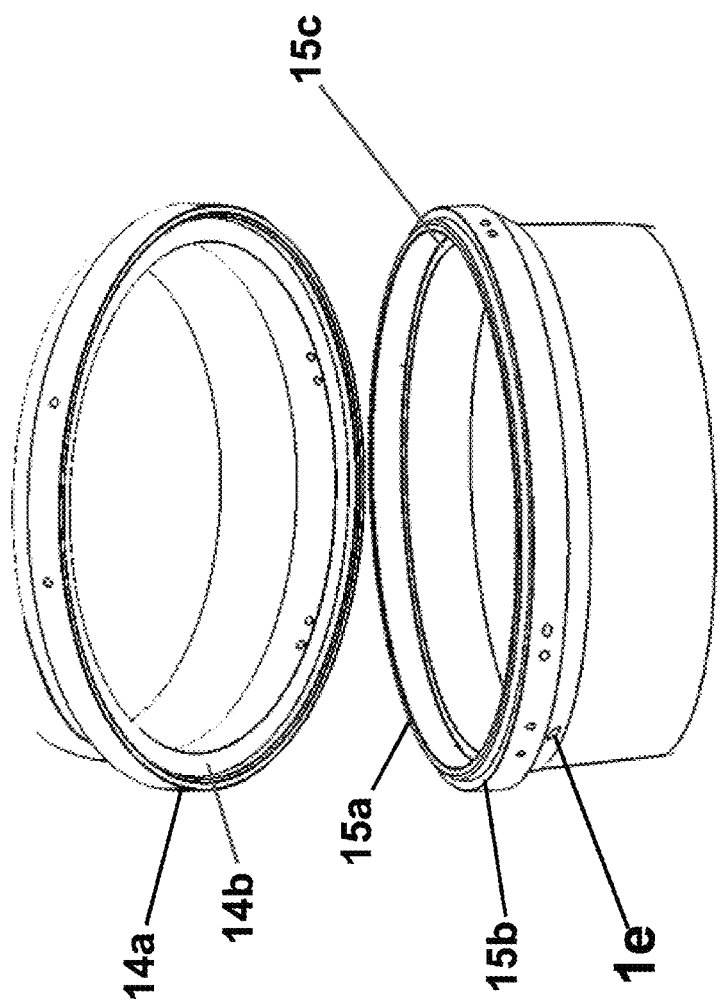
FIGS. 10(a) and 10(b) are front cut-off views of the lower portion of the top unit and top portion of the base unit that depict an embodiment of the tongue and groove edges of the top and bottom unit.
Figure 10B:
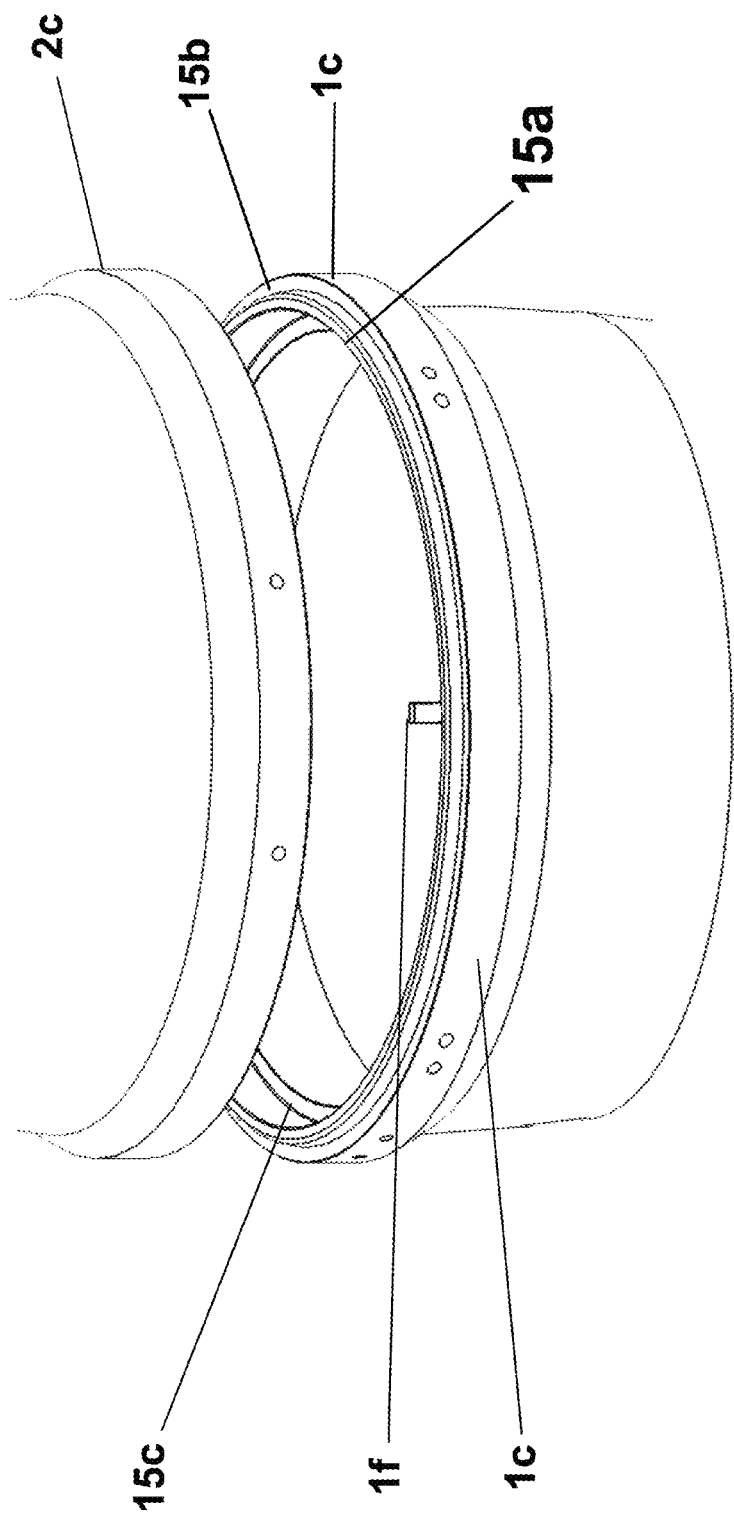

The present invention is designed to form an at least partial seal between the top and base units 1 and 2 while reducing or completely eliminating the need for gaskets. In other embodiments, gaskets can be employed, but they will be shielded from the flame and heat to prolong their use. To do so, the present embodiment comprises and utilizes a molded tongue and groove-like system on the upper and lower edges 14 and 15 that work in concert to substantially seal the chamber without need for a gasket. Turning to FIG. 10, an embodiment of the tongue and groove system are shown, wherein both the top and lower edges 14 and 15 comprise a protruding tongue portion, 14a and 15a, and a recessed grove portion, 14b and 15b. Although the term groove is used, it may either be a recess in the actual side wall into which the protruding tongue may depend into when closed, or it may simply act as a recess in relation to the tongue, such that the recessed groove may be substantially linear with the rest of the edge except for the protruding tongue. As depicted, the top protruding tongue portion 14a is external to top recessed groove portion 14b, and, conversely, bottom protruding tongue portion 15a is internal to bottom recessed groove portion 15b so that the top tongue and bottom recess can mate externally to the bottom tongue and top recess in a lattice-like manner when the top unit 2 is closed. It is understood that this arrangement may be switched. As depicted, the two tongues line up in parallel to form a layer of insulation. Depending on the thickness of the tongue portions, the combined layer of insulation may be substantially equal in thickness to that of the top and base side walls, or it may be greater as it is located in the hinge connection sections. In various embodiments, it may be desirable for the tongue portions to be substantially equivalent in length or for the external tongue to be slightly longer than the internal tongue. Remaining on FIG. 10, it is shown that when employing an external top tongue portion, heat is required to rise over the bottom tongue and then go against the principles of thermal dynamics to descend to escape. In an embodiment where the groove is a true recess, the tongue portions would contact and socket into the grooves, thereby forming an at least partial seal. The seal formed by either described embodiment of the tongue and groove-like system prevents the leakage of heat and air. It also prevents moisture from the meat from escaping the heating chamber, allowing for the meats cooked to maintain their natural juices and oils.

Figure 12:
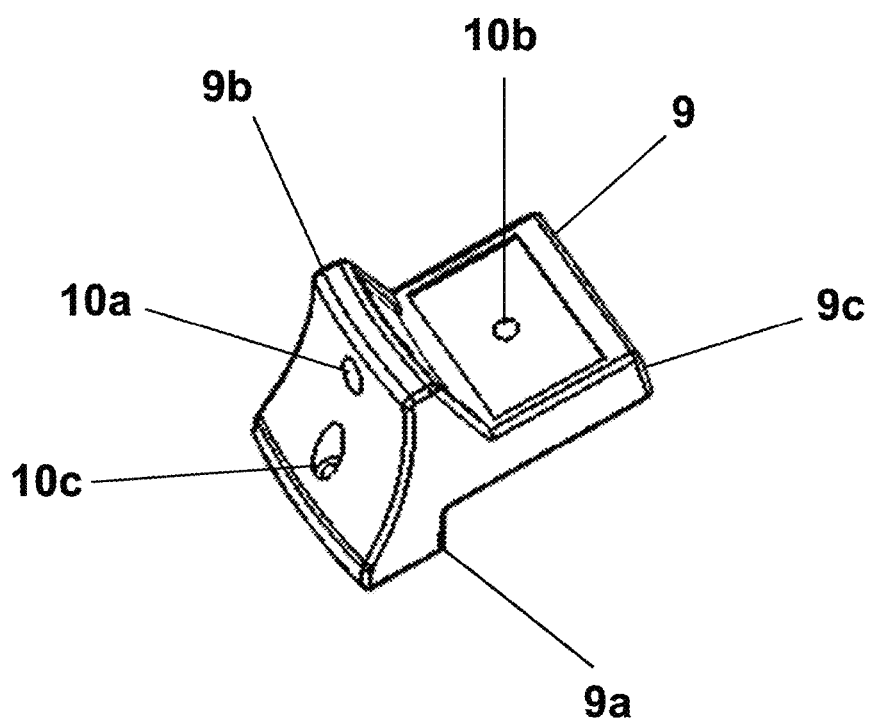
FIG. 12 shows a zoomed in view of an embodiment of grill feet stabilizers connected to the embodiments in FIG. 1.

Because the Cooking Apparatus is constructed of a sturdy malleable material that is capable of being tapped, drilled or otherwise threaded, numerous external components can be attached directly to the Cooking Apparatus which has otherwise been impossible until this time. For example, support structures 9, which are depicted as feet, can be mechanically fastened to the base unit 1. It is generally believed in the industry that air and cement can be used to dissipate the heat so as to help prevent the heat emanating from the cooking apparatus from starting a fire with the surroundings, whether a wooden table or other external apparatus. Support structures 9 are attached to the cooking apparatus at or near circular base 1a so as to raise and prop up the cooking apparatus, allowing air to pass underneath the apparatus to dissipate heat. It is preferably that the support structures are created from fire retardant materials themselves, such as metals, ceramic, concrete or other refractants. Turning to FIG. 12, a support structure 9 is shown in the shape of feet comprising, generally, a vertical base 9a, a vertical member 9b, and a horizontal member 9c. The support structure 9 is capable of being mechanically secured to the base unit 1. For example, in the depicted embodiment, the support structures are screwed or bolted to the base unit 1 though vertical member orifice 10a and horizontal member orifice 10b. As further depicted, the feet can comprise an additional horizontal member orifice 10b that does not line up with the cooking apparatus. Instead, a screw is capable of being vertically driven through the horizontal member orifice 10b and into an external surface such as a table or packaging box to secure the grill in place. Turning back to FIGS. 4-8, it is shown that other components such as side shelves 12 can be attached directly to the cooking apparatus. As depicted, side shelves 12 are connected to cooking apparatus base unit 1 via shelf hinge system 12c which is in turn mounted to the base unit 1 via shelf connector means 12b. Because the aluminum chassis can be drilled, connecting screws can be predrilled into the external side of base unit. These screws can be manipulated to tighten or loosen. For example, the screws can be loosened to form a gap between the head of the screw and the base unit exterior wall. Mounting brackets such as for the shelves can be socketed around the head of the screws and then the screws are tightened to hold the brackets in place. This process can be used on numerous mountable accessories such as shelves, hooks, or lights.

Additionally, because the grill can be drilled into without damaging the structural integrity, access ports can be created for the incorporation of other accessories. As shown best in FIG. 11, the base side wall 2b comprises a side access port 1e through the base side wall 2b in the base hinge component 1c. This side access port 1e can be employed for a multitude of reasons. For example, one or more temperature probes may be inserted into the cooking chamber 0 for temperature readings on the food or grill itself. As depicted in FIGS. 4-7, the side access port 1e can be used to set the cooking apparatus as a rotisserie via use of an external rotisserie motor 22, a rotisserie mounting bracket 23, a rotisserie rod 24 that is longer than the diameter of the cooking chamber 0 at the desired height of use, and a rotisserie charcoal basket 25. As shown, one end of rotisserie mounting bracket 23 remains external to the cooking chamber 0 wherein it contacts rotisserie motor 22. The other end of rotisserie rod 24 passes through side access port 1e and depends into the cooking chamber 0 wherein it is mounted onto rotisserie mounting bracket 23 on the opposing interior end of the cooking chamber 0. A rotisserie charcoal basket 25 is positioned so as to provide a heat source planer to the rotisserie rod 24. It is also possible that shelf 12 near access port plug 26 may have a rotisserie rod cut out 12d that would accommodate components that would be placed into the side access port 1e such as temperature probe wires or the rotisserie rod 24.

It is necessary that the side access port 1e is capable of being controllable sealed when not being used. When used in a rotisserie configuration, it is not necessary or even possible to plug the side access port 1e. However, it is necessary to do so in other configurations such as a smoker or regular grill. Access port plug 26 is diametrically shaped to form a substantial seal of side access port 1e when used. As depicted, access port plug 26 and side access port 1e have corresponding internal (port) and external (plug) threadings such that the access plug 26 can be screwed into and out of the side access port 1e to controllable seal or open the side access port 1e. The access plug 26 is connected to the chassis of the grill by a connector 26a which is a metal wire of a suitable length to allow the access plug 26 to be easily manipulated into and out of the side access port 1e while maintaining the attachment of the access plug 26 to the grill to prevent loss.

For the purpose of understanding the Cooking Apparatus, references are made in the text to exemplary embodiments of a Cooking Apparatus, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the Cooking Apparatus may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change to the basic function to which it is related.

PARTS LIST

0. Cooking chamber
1. Base unit
1a. Circular base
1b. Base side wall
1c. Base hinge component (connector)
1d. Air vent aperture
1e Side access port
1f Grate support means (ledges)
2. Top unit
2a. Crown
2b. Dome shaped top wall
2c. top hinge connector
2d. Top aperture
2e. Thermometer aperture
2f Crown wedge members
3. Top outlet vent
3a. Top Apertures
4. Top sealing means (component)
4a. Daisy wheel with gaps
5. Adjustable air intake vent (air intake valve unit)
5a. Vent door (door member)
5b. Mounting components
5c. Hinge body
5d Door plate
5e Air intake conduit
5f Disk
5g Mesh screen
5h Locking mechanism
6. Circular pin-wheel apparatus (solid disk)
6a. Handle
7a. Handle
7b. Handle mounting means
8. Hinge
9. Support structures
9a. Vertical base
9b. Vertical member
9c. Horizontal member
10a. Vertical member orifice
10b. Horizontal member orifice
10c. External connection orifice
11. Thermometer
12. Side shelves
12b. Shelf connector means
12c. Shelf hinge system
12d. Rotisserie rod cut out
14. Upper edge
14a. Protruding tongue portion
14b. Recessed groove portion
15. Lower edge
15a. Protruding tongue portion
15b. Recessed groove portion
15c. Ledge for grill grate
16. Ash trap chamber
17. Ash trap tray
18. Firebox
19. Charcoal grate (cooking grate)
20. Middle grate
21. Top grate
22. Rotisserie motor
23. Rotisserie mounting bracket.
24. Rotisserie rod
25. Rotisserie charcoal basket.
26. Access Port Plug (connector)

The invention claimed is:
1. A kamado style grilling apparatus comprising:
 a) a cooking chamber having a high heat capacity and a vent system;
 b) wherein the cooking chamber further comprises and is defined by a base unit and a top unit which is a dome-shaped lid with a crown disposed over the base unit that is capable of moving from an open to a closed position via a hinge connected to the top unit and bottom unit;
 c) wherein the base unit comprises a base and a peripheral side wall extending upwardly from said base towards a base unit edge and the top unit comprises a top unit edge that contacts the base unit edge when the top unit is in a closed position, thereby defining the cooking chamber;
 d) wherein the vent system comprises at least one adjustable air intake vent in the base unit and at least one adjustable air outlet vent in the crown of the top unit with a damper operationally connected at the air outlet vent such that air is capable of passing into the cooking chamber through said at least one air intake vent and out of the cooking chamber through said at least one outlet vent when the vents are open; and
 e) wherein said base unit edge comprises a base unit tongue portion and a base unit recessed portion and wherein said top unit comprises a top unit tongue portion and a top unit recessed portion, said top unit tongue portion being external relative to said cooking chamber to said top unit recessed portion and said base unit tongue portion being internal relative to said cooking chamber to said base unit recessed portion so that said top unit tongue portion and said base unit recess portion mate externally to said base unit tongue portion and said top unit recess portion.
2. The apparatus of claim 1 wherein the top unit comprises a dome-shaped lid with a crown, wherein a vent aperture is molded into the crown, and wherein a damper is operationally connected at the vent aperture.

3. The apparatus of claim 2 wherein the base unit side wall is substantially frustoconical in shape such that the base is diametrically smaller than the base unit edge.

4. The apparatus of claim 1 further comprising a. an access port in the side wall of base unit through which a cooking accessory can be inserted and b. a removable plug that seals the access port when inserted into the access port, wherein the plug insulates heat from the cooking chamber and wherein the cooking accessory is selected from a group comprising a temperature probe, thermometer, rotisserie rod, a charcoal lighter, a burner, an igniter, a conduit attached to a smoke box, or a conduit attached to a pellet smoker.

5. The apparatus of claim 4 wherein the plug is securely inserted into the access port.

6. The apparatus of claim 5 wherein the access port is internally threaded and the plug is externally threaded such that the plug can be screwed into and out of the access port for opening and closing the access port.

7. The apparatus of claim 1 wherein the top unit and base side walls are each substantially uniform in thickness throughout except for the respective regions adjacent to the top unit edge and base unit edge which are thicker than the rest of the unit, and wherein the hinge connects to the top unit and base unit in the thicker portions of the units.

8. The apparatus of claim 7 wherein the top unit and base side walls are each substantially uniform at about one inch in thickness except for the respective regions adjacent to the top unit edge and base unit edge which are greater than 1 inch in thickness but less than 2 inches in thickness.

9. The apparatus of claim 1 wherein the air intake vent is an aperture in the base unit side wall that can be controllably sealed by an intake regulatory unit comprising a door member shaped and positioned so as to substantially cover the entirety of the aperture in the side wall, wherein the door member itself has at least one aperture that is capable of being controllably sealed or exposed to control the amount of air that can flow through the door member and into the base unit side wall aperture, wherein the door member is mechanically fastened to the base unit side wall via a hinge that allows the door member to pivot along the hinge's axis away from the aperture in the base unit side wall to expose the aperture.

10. The apparatus of claim 9 wherein the door member comprises a cylindrical protrusion that extends outwards on the side of the door member external to the cooking chamber, wherein the cylindrical protrusion has a first interior side facing the side wall aperture that is substantially open and a second side opposing the first that is at least partially closed with at least one orifice, wherein an air damper disk comprising a circular disk body diametrically shaped to fit within the cylindrical protrusion is rotatably attached within the cylindrical protrusion such that it contacts the second side of the cylindrical protrusion, and wherein the air damper disk further comprises at least one gap in the disk body that corresponds in shape and size to the at least one orifice in the second side of the cylindrical protrusion such that the air damper disk can rotate about its attachment regulate the amount of air allowed to flow through the at least one orifice and corresponding gap.

11. The apparatus of claim 9 wherein a mesh screen is operationally attached so as to be located between the opening of the door member and the base unit when the door member is closed.

12. The apparatus of claim 10 further comprising a rotatable latch attached to the side wall that is capable of selectively securing the door member in a closed position when engaged or allowing the door member to pivot away from the side wall when disengaged.

13. The apparatus of claim 9 wherein a damper is operationally coupled to the door member around the aperture in the door member.

14. The apparatus of claim 1 further comprising at least one external accessory directly screwed into to either the top unit or base unit, wherein the external accessory is selected from a group consisting of a thermometer, a handle, a shelf, a hinged shelf, a support structure, support feet, a pellet smoker, a smoke box, a charcoal lighter, a light, a flexible light member, a hook for mounting grilling utensils, or an automobile mount.

15. The apparatus of claim 1 further comprising a plurality of external support feet connected to the base unit, each external support foot comprising a vertical member and a horizontal member, wherein the support structure is mechanically coupled to the base unit, wherein the support feet are connected such that a portion of the base rests on top of the horizontal member of each support foot, the base unit rests interior to said vertical portion, and the cooking apparatus is elevated from an external surface by the support feet to form an air gap between the base unit and the external surface.

16. The apparatus of claim 1 wherein at least the base unit and the top unit comprise an aluminum alloy selected from the group comprising aluminum silicone, aluminum iron, aluminum manganese, aluminum zinc, ZL-101, ZL-104, or combinations thereof.

17. The apparatus of claim 1 wherein the top unit and the base unit comprise an aluminum chassis of between 0.5 and 2 inches in thickness.

18. The apparatus of claim 1 wherein the base side wall comprises a contiguous interior side wall itself comprising a plurality of ledges operationally connected at a substantially equal height from the base to allow a grate to be supported thereon.

19. The apparatus of claim 18 wherein the ledges are cast into the base unit side wall.

20. The apparatus of claim 18 wherein the interior side of base unit side wall comprises at least two sets of ledges, wherein each set comprises a plurality of ledges connected to the interior side of base unit side wall at a set height from the base unit, wherein each set is at a different height form the base unit.

* * * * *